(12) United States Patent
Ohno et al.

(10) Patent No.: US 6,294,310 B1
(45) Date of Patent: Sep. 25, 2001

(54) OPTICAL INFORMATION RECORDING MEDIUM AND OPTICAL RECORDING METHOD

(75) Inventors: Takashi Ohno; Michikazu Horie, both of Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/551,566

(22) Filed: Apr. 18, 2000

Related U.S. Application Data

(62) Division of application No. 08/941,720, filed on Oct. 1, 1997, now Pat. No. 6,143,468.

(30) Foreign Application Priority Data

| Oct. 4, 1996 | (JP) | 8-264357 |
|---|---|---|
| Oct. 4, 1996 | (JP) | 8-264358 |
| Mar. 12, 1997 | (JP) | 9-57496 |
| Mar. 19, 1997 | (JP) | 9-66196 |

(51) Int. Cl.⁷ .................................................. G11B 7/24
(52) U.S. Cl. ................ 430/270.13; 369/288; 369/275.5; 369/275.2; 428/64.1
(58) Field of Search ...................... 430/270.13; 369/288, 369/275.2, 295.5; 428/64.1

(56) References Cited

U.S. PATENT DOCUMENTS

| 4,889,746 | 12/1989 | Utsumi et al. . |
| 4,904,577 | 2/1990 | Tyan et al. . |
| 5,001,723 | 3/1991 | Harigaya et al. . |
| 5,024,910 | 6/1991 | Ohta et al. . |
| 5,254,382 | 10/1993 | Ueno et al. . |
| 5,270,149 | 12/1993 | Iselborn et al. . |
| 5,362,538 | 11/1994 | Ohbayashi et al. . |
| 5,367,514 | 11/1994 | Kobayashi et al. . |
| 5,395,735 | 3/1995 | Nagata et al. . |
| 5,591,501 | 1/1997 | Ovshinsky et al. . |
| 5,627,012 | 5/1997 | Tominaga et al. . |
| 5,688,574 | 11/1997 | Tamura et al. ..................... 428/64.1 |
| 5,709,978 | 1/1998 | Hirotsune et al. . |
| 5,818,808 | 10/1998 | Takada et al. . |
| 5,862,123 | 1/1999 | Horie et al. ........................ 369/275.1 |
| 6,004,646 | 12/1999 | Ohno et al. ........................ 428/64.1 |

FOREIGN PATENT DOCUMENTS

| 0 195 532 | 9/1986 | (EP) . |
| 0 378 443 | 7/1990 | (EP) . |
| 0 405 610 | 1/1991 | (EP) . |
| 01-303643 | 12/1988 | (JP) . |
| 01-211249 | 8/1989 | (JP) . |
| 05-62249 | 3/1993 | (JP) . |
| 09-161316 | 6/1997 | (JP) . |

OTHER PUBLICATIONS

Ohta et al., "Phase Change Disk . . . ", Jap. J. Appl. Phys., 28 (3), pp. 123–128.
Abstract of JP 01–277338.

*Primary Examiner*—Martin Angebranndt
(74) *Attorney, Agent, or Firm*—Oblon, Spivak, McClelland, Maier & Neustadt, P.C.

(57) ABSTRACT

An optical information recording medium having a multi-layer structure comprising at least a lower protective layer, a phase-change type optical recording layer, an upper protective layer and a reflective layer, on a substrate, wherein the phase-change type optical recording layer has a composition of $Ge_f(Sb_dTe_{1-d})_{1-f}$, where $0.65 \leq d \leq 0.85$, and $0.01 \leq f \leq 0.20$, whereby overwrite recording is carried out by modulation of light intensity of at least strong and weak two levels, so that a crystalline state is an unrecorded state, and an amorphous state is a recorded state.

7 Claims, 3 Drawing Sheets

OPTICAL INFORMATION RECORDING MEDIUM AND OPTICAL RECORDING METHOD

This is a divisional of Ser. No. 08/941,720 filed Oct. 1, 1997, now U.S. Pat. No. 6,143,468.

The present invention relates to an optical information recording medium of recordable/erasable type utilizing a difference in reflectivity or a phase difference of reflected light resulting from a phase-change of the recording layer by irradiation of a laser beam.

Optical disks are classified into a read only memory (ROM) type and a recordable type (including a rewritable type). The read only memory type has already practically been used as a video disk, an audio disk or a disk memory for a large capacity computer.

Typical recordable type disks include disks of pit-forming/deformation type, organic dye type, magneto-optical type and phase-change type. For the pit-forming/deformation type, a recording layer made of e.g. a dye or a low melting point metal such as Te, is employed, and the recording layer is locally heated by irradiation with a laser beam to form pits or irregularities.

For the organic dye type, a recording layer made of a dye or a polymer containing a dye, is employed, so that the reflectivity (or the refractive index) changes between before and after the recording. This type is practically employed as an optical recording medium for recording CD format signals.

The magneto-optical type is designed to carry out recording or erasing by the direction of magnetization of the recording layer and to carry out retrieving by an magneto-optical effect.

On the other hand, the phase-change type is the one which utilizes a phenomenon that the reflectivity or the phase of reflected light changes between before and after the phase change, whereby retrieving is carried out by detecting the difference in the quantity of reflected light without requiring an external magnetic field. As compared with the magneto-optical type, the phase-change type requires no magnet, and the optical system is simple, whereby preparation of a driving system is easy, and such a phase-change type is advantageous also for downsizing and reduction of costs. Further, it has advantages such that recording and erasing can be carried out simply by modulating the power of a laser beam, and a one-beam overwriting operation is thereby possible wherein erasing and re-recording are carried out simultaneously by a single beam.

It is common to employ a thin film of a chalcogen type alloy as the material for the recording layer for such a phase-change recording system. For example, it has been attempted to use a thin film of an alloy of Ge—Te type, Ge—Sb—Te type, In—Sb—Te type, Ge—Sn—Te type or Ag—In—Sb—Te type.

In the one-beam overwriting phase-change recording, it is common to form recording bits by changing a recording layer in a crystalline state to an amorphous state and to carry out erasing by crystallizing the amorphous phase.

However, the recording layer is usually amorphous immediately after its formation. Accordingly, the entire recording layer is crystallized in a short period of time. This step is called initial crystallization or initialization. It is common to carry out the initialization by irradiating a rotating medium with a laser beam focused to have a diameter of from a few tens to a few hundreds $\mu$m.

With respect to the above-mentioned Ge—Sb—Te type ternary alloy, only a composition close to a GeTe—$Sb_2Te_3$ pseudo-binary alloy has heretofore attracted an attention and has been practically developed, and a composition close to a $Te_{85}Ge_{15}$ eutectic composition or a $Sb_{70}Te_{30}$ eutectic composition has not been practically employed.

Namely, an alloy material close to the eutectic composition has been considered to be unsuitable as a recording layer for an overwritable optical recording medium, since it undergoes phase separation at the time of crystallization, and it has been impossible to crystallize it by heating for a short period of time of less than 100 nsec, although its amorphous-forming ability is high.

For example, even with a Ge—Sb—Te type ternary alloy, no practically crystallization speed has been obtained with a composition close to the $Te_{85}Ge_{15}$ eutectic composition.

On the other hand, in the vicinity of the $Sb_{70}Te_{30}$ eutectic composition, a binary alloy of $Sb_uTe_{1-u}$ (0.58<u<075) is known to be useful for repeated recording and erasing as between the crystalline and amorphous states, although this is an extremely primitive method wherein only a change in reflectance was monitored (U.S. Pat. No. 5,015,548). Further, a study has been made on a compositional range having a third element, particularly Ge, added to $Sb_{70}Te_{30}$.

However, these methods have a problem that the productivity is low, since the initialization operation is difficult. Accordingly, there has been no practical progress since then with respect to a composition close to the $Sb_{70}Te_{30}$ eutectic composition.

Accordingly, it has been considered that only a material in the vicinity of a readily initializable intermetallic composition or its pseudo binary alloy exhibits practical properties.

Irrespective of such a conventional belief, the present inventors have re-examined the crystallization/amorphous conversion properties of the medium having a composition in the vicinity of the eutectic composition, and as a result, have found that such a medium exhibits characteristics superior to a medium having a composition in the vicinity of the composition of the above-mentioned intermetallic compound, when the composition, the layer construction, the recording method, etc. are properly combined.

Namely, the present inventors have conducted a study from the viewpoint of the applicability to mark length recording using an optical disk evaluation machine suitable for high density recording.

As a result, it has been found that a recording layer comprising, as the main component, a SbTe alloy in the vicinity of the $Sb_{70}Te_{30}$ eutectic composition has a difficulty only in the initial crystallization, and once it has been initially crystallized, subsequent recording and erasing can be carried out at an extremely high speed.

Further, it has been found that a GeSbTe ternary alloy and an InSbTe ternary alloy having Ge or In added thereto, exhibits excellent repetitive overwriting properties.

Especially in a combination with a certain specific recording pulse pattern, it has a merit such that deterioration during repetitive overwriting is less than the material in the vicinity of a BeTe—$Sb_2Te_3$ pseudo-binary alloy or a material in the vicinity of an InGeTe—$Sb_2Te_2$ pseudo-binary alloy, which is widely used for repetitive overwriting.

It has been also found that these ternary alloys based on $Sb_{70}Te_{30}$ have higher crystallization temperatures than the $Sb_{70}Te_{30}$ binary eutectic alloy and thus are excellent in archival stability.

However, these ternary alloys based on $Sb_{70}Te_{30}$ had a problem that initialization was more difficult than the $Sb_{70}Te_{30}$ binary eutectic alloy.

Further, the GeSbTe ternary alloy in the vicinity of the above SbTe eutectic composition had a problem that the recording pulse pattern dependency and the linear velocity dependency were large, and when an usual two level modulation pulse pattern was employed, normal overwriting was possible only within a narrow linear velocity range.

Namely, at a low linear velocity such as 2.8 m/s, recrystallization was so remarkable that formation of amorphous marks tended to be impaired. On the other hand, at a high linear velocity, the crystallization speed was inadequate, and erasing tended to be inadequate. Therefore, proper overwriting was possible only within a limited linear velocity range of 2.8 m/s±50%.

It is an object of the present invention to solve such problems involved in using a material having a composition in the vicinity of such a eutectic composition and to make the application of such a material to a high density optical recording medium possible.

In a first aspect, the present invention provides:

An optical information recording medium having a multilayer structure comprising at least a lower protective layer, a phase-change type optical recording layer, an upper protective layer and a reflective layer, on a substrate, wherein the phase-change type optical recording layer has a composition of $Zn_{\gamma 1}In_{\delta 1}Sb_{\zeta 1}Te_{\omega 1}$, where $0.01 \leq \gamma 1 \leq 0.1$, $0.03 \leq \delta 1 \leq 0.08$, $05 \leq \zeta 1 \leq 0.7$, $0.25 \leq \omega 1 \leq 0.4$, and $\gamma 1+\delta 1+\zeta 1+\omega 1=1$, whereby overwrite recording is carried out by modulation of light intensity of at least strong and weak two levels, so that a crystalline state is an unrecorded state, and an amorphous state is a recorded state; and An optical information recording medium having a multilayer structure comprising at least a lower protective layer, a phase-change type optical recording layer, an upper protective layer and a reflective layer, on a substrate, wherein the phase-change type optical recording layer has a composition of $Zn_{\gamma 2}In_{\delta 2}Ma_{\epsilon 2}Sb_{\zeta 2}Te_{\omega 2}$, where Ma is at lest one member selected from Sn, Ge, Si and Pb, $0.01 \leq \gamma 2 \leq 0.1$, $0.001 \leq \delta 2 \leq 0.1$, $0.01 \leq \epsilon 2 \leq 0.1$, $0.5 \leq \zeta 2 \leq 0.7$, $0.25 \leq \omega 2 \leq 0.4$, $0.03 \leq \delta 2+\epsilon 2 \leq 0.15$, and $\gamma 2+\delta 2+\epsilon 2+\zeta 2+\omega 2=1$, whereby overwrite recording is carried out by modulation of light intensity of at least strong and weak two levels, so that a crystalline state is an unrecorded state, and an amorphous state is a recorded state.

In a second aspect, the present invention provides:

An optical information recording medium having a multilayer structure comprising at least a lower protective layer, a phase-change type optical recording layer, an upper protective layer and a reflective layer, on a substrate, for overwrite recording by modulation of light intensity of at least two levels, so that a crystalline state is an unrecorded state, and an amorphous state is a recorded state, wherein the phase-change type optical recording layer has a composition of $Mb_zGe_y(Sb_xTe_{1-x})_{1-y-z}$, where Mb is at least one member selected from Ag and Zn, $0.60 \leq x \leq 0.85$, $0.01 \leq y \leq 0.20$, and $0.01 \leq z \leq 0.15$; and An optical recording method, which comprises carrying out mark length modulation recording and erasing on such an optical information recording medium by modulating a laser power among at least 3 power levels, wherein to form inter-mark portions, erasing power Pe capable of recrystallizing amorphous mark portions is applied, and to form mark portions having a length nT where T is a clock period and n is an integer of at least 2, writing power Pw and bias power Pb are applied in such a manner that when the time for applying writing power Pw is represented by $\alpha_1T$, $\alpha_2T, \ldots, \alpha_mT$, and the time for applying bias power Pb is represented by $\beta_1T, \beta_2T, \ldots, \beta_mT$, the laser application period is divided into m pulses in a sequence of $\alpha_1T, \beta_1T, \alpha_2T, \beta_2T, \ldots, \alpha_mT, \beta_mT$, to satisfy the following formulae:

when $2 \leq i \leq m-1$, $\alpha_i \leq \beta_i$;

$m=n-k$, where k is an integer of $0 \leq k \leq 2$, provided that $n_{min}-k \geq 1$, where $n_{min}$ is the minimum value of n; and $\alpha_1+\beta_1+ \ldots +\alpha_m+\beta_m=n-j$, where j is a real number of $0 \leq j \leq 2$;

and under such conditions that Pw>Pe, and $0 \leq Pb \leq 0.5Pe$, provided that when i=m, $0 \leq Pb \leq Pe$.

In a third aspect, the present invention provides:

An optical information recording medium having a multilayer structure comprising at least a lower protective layer, a phase-change type optical recording layer, an upper protective layer and a reflective layer, on a substrate, wherein the phase-change type optical recording layer has a composition of $Ge_f(Sb_dTe_{1-d})_{1-f}$, where $0.60 \leq d \leq 0.85$, and $0.01 \leq f \leq 0.20$ and has a thickness of from 15 to 30 nm, the protective layer has a thickness of from 10 to 50 nm, and the reflective layer is made of a metal containing at least 90 atomic % of Au, Ag or Al and has a thickness of from 50 to 500 nm, whereby mark length modulation recording and erasing are carried out by modulating a laser power among at least 3 power levels at a linear velocity of from 1 to 7 m/s, wherein to form inter-mark portions, erasing power Pe capable of recrystallizing amorphous mark portions with irradiation for less than 100 nanoseconds is applied, and to form mark portions having a length nT where T is a clock period and n is an integer of at least 2, writing power Pw and bias power Pb are applied in such a manner that when the time for applying writing power Pw is represented by $\alpha_1T$, $\alpha_2T, \ldots, \alpha_mT$, and the time for applying bias power Pb is represented by $\beta_2T, \beta_2T, \ldots, \beta_mT$, the laser application period is divided into m pulses in a sequence of $\alpha_1T, \beta_1T, \alpha_2T, \beta_2T, \ldots, \alpha_mT, \beta_mT$, to satisfy the following formulae:

when $2 \leq i \leq m-1$, $\alpha_i \leq \beta_i$;

$m=n-k$, where k is an integer of $0 \leq k \leq 2$, provided that $n_{min}-k \geq 1$, where $n_{min}$ is the minimum value of n; and $\alpha_1+\beta_1+ \ldots +\alpha_m+\beta_m=n-j$, where j is a real number of $0 \leq j \leq 2$;

and under such conditions that Pw>Pe, and $0 \leq Pb \leq 0.5Pe$, provided that when i=m, $0 \leq Pb \leq Pe$.

Figure 1:
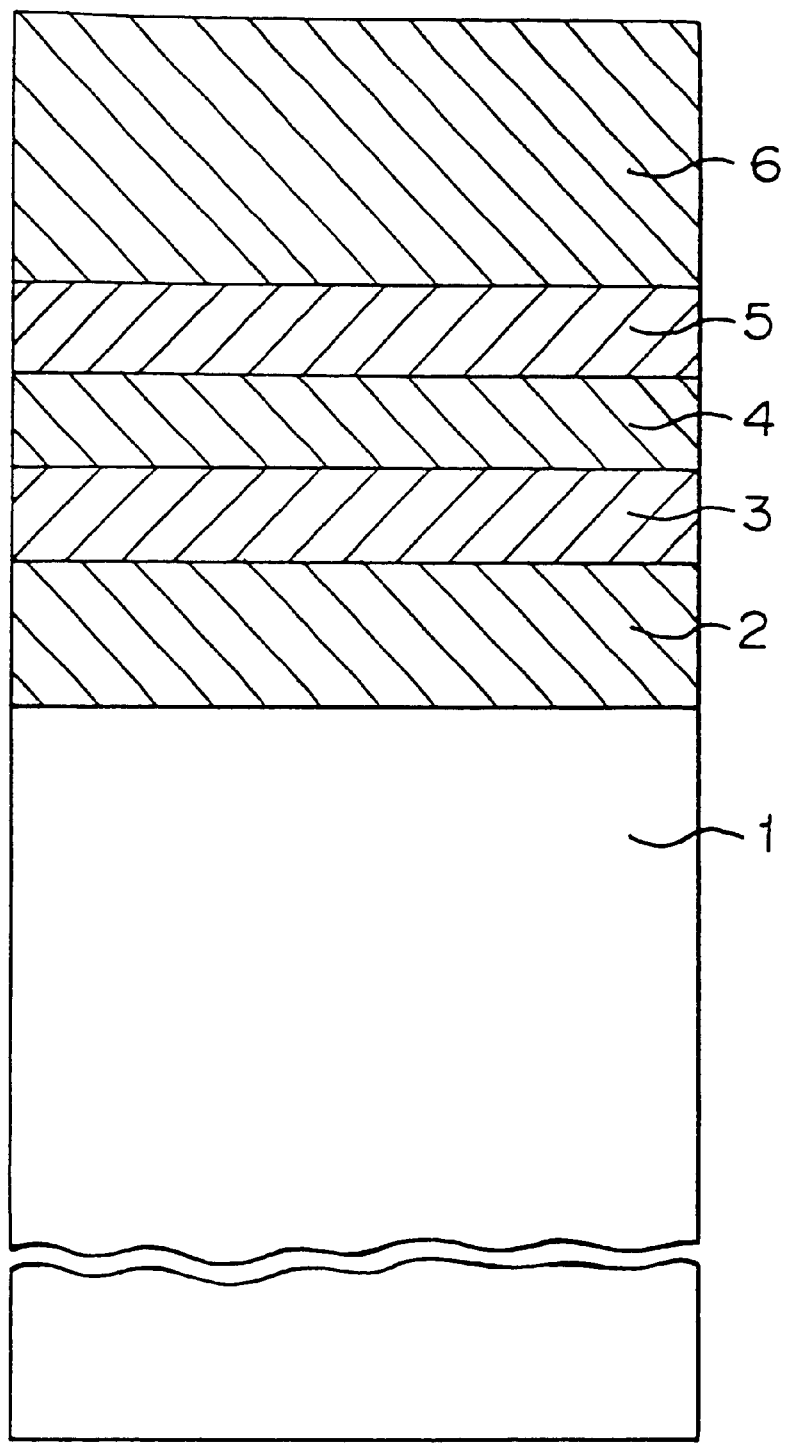
FIG. 1 is a schematic view illustrating the multilayer structure of the optical recording medium of the present invention.

Before describing the recording media and the recording method of the present invention, the concept which led to the present invention will be described.

To carry out recording on a phase-change type medium, a laser beam is irradiated to a recording layer in a crystalline state to heat and melt it at a temperature of at least the melting point, followed by rapid resolidification to form amorphous marks. To carry out erasing, a laser beam is irradiated to the amorphous marks to heat them at a temperature of at least the crystallization temperature and lower than the melting point, followed by cooling for crystallization i.e. for erasing.

Usually, if the crystallization speed in a solid phase of an alloy in the vicinity of the eutectic point is increased, the recrystallization speed will also be increased, so that the periphery of the molten region of the recording layer tends to undergo recrystallization, whereby formation of an amorphous mark tends to be prevented.

In an alloy in the vicinity of the eutectic point, the crystallization speed is governed by the diffusion speed of atoms for phase separation, whereby high speed crystallization (erasing) can not be accomplished unless heating is carried out to a level immediately below the melting point, where the diffusing speed becomes maximum.

Namely, as compared with the currently most commonly employed recording layer close to the composition of a GeTe-$Sb_2Te_3$ pseudo-binary alloy, the temperature range within which a high crystallization speed is obtainable, is narrow and shifted to a high temperature side.

Accordingly, to apply such an alloy in the vicinity of the eutectic point to a recording layer of an optical recording medium, it is necessary to increase the cooling rate in the vicinity of the melting point during the resolidification in order to accomplish both the high crystallization speed and formation of a sufficiently large amorphous mark.

The present inventors have found it possible to accomplish the high crystallization speed by utilizing a phenomenon such that the recording layer material undergoes phase separation basically into a Sb phase and a $Sb_2Te_3$ phase on the line where the $Sb_{70}Te_{30}$ ratio is constant in the composition of a SbTe eutectic alloy.

Namely, if excess Sb is contained in a non-equilibrium super-cooled state where an amorphous mark is formed, fine Sb clusters will firstly precipitate during the resolidification. Such Sb clusters will remain as crystal nuclei in the amorphous mark, and it is considered that the subsequent erasing (recrystallization) of the amorphous mark can be completed in a short period of time without requiring a substantial time for the phase separation.

When annealing is conducted in an equilibrium state, the phase separation of Sb phase can be confirmed by X-ray diffraction.

The present invention has been accomplished on the basis of such an observation relating to the SbTe eutectic alloy. In the first aspect of the present invention, the composition of the ZnInSbTe four element alloy recording layer or the ZnInMaSbTe five element alloy (wherein Ma is at least one member selected from Sn, Ge, Si and Pb) recording layer is such that predetermined amounts of Zn, In and optional Ma are added to a base in the vicinity of the $Sb_{70}Te_{30}$ eutectic composition. The largest merit in using this material is that it has a high crystallization speed, and it is thereby possible to prevent a phenomenon of forming coarse grains having a reflectivity different from the initialized state along the periphery of an amorphous mark or in an erased mark.

The recording characteristic of the recording layer i.e. the reversible process of amorphization and crystallization, is primarily determined by the Sb/Te ratio, that is, the excess Sb amount contained in the matrix $Sb_{70}Te_{30}$ eutectic composition. If Sb increases, sites of Sb clusters which precipitate in the super-cooled state will increase, whereby formation of crystal nuclei will be promoted. This means that even when the same crystal growing rate from the respective crystal nuclei is assumed, the time required until the space is filled with grown crystal particles will be shortened, and consequently, the time required for complete crystallization of the amorphous mark can be shortened. Accordingly, this is advantageous when erasing is carried out at a high linear velocity by irradiation with a laser beam in a short period of time.

On the other hand, the cooling rate of the recording layer depends also on the linear velocity during recording. Namely, even with the same multilayer structure, the cooling rate lowers as the linear velocity is low. Accordingly, as the linear velocity is low, it is preferred to employ a composition whereby the critical cooling rate for the formation of an amorphous state is small i.e. a composition in which the excess Sb amount is small.

In summary, based on the $Sb_{70}Te_{30}$ eutectic composition, the larger the excess Sb amount in the composition, the better the composition for high linear velocity.

The recording layer of the present invention is the one having the characteristics of this binary alloy having the $Sb_{70}Te_{30}$ eutectic composition improved by adding a specific combination of two or three elements in a suitable amount.

The composition of the recording layer of the present invention is represented by the following formula. Namely it is a composition represented by $Zn_{\gamma 1}In_{\delta 1}Sb_{\zeta 1}Te_{\omega 1}$, where $0.01 \leq \gamma 1 \leq 0.1$, $0.03 \leq \delta 1 \leq 0.08$, $0.5 \leq \zeta 1 \leq 0.7$, $0.25 \leq \omega 1 \leq 0.4$, and $\gamma 1 + \delta 1 + \zeta 1 + \omega 1 = 1$, or a composition represented by $Zn_{\gamma 2}In_{\delta 2}Ma_{\epsilon 2}Sb_{\zeta 2}Te_{\omega 2}$, where Ma is at lest one member selected from Sn, Ge, Si and Pb, $0.01 \leq \gamma 2 \leq 0.1$, $0.001 \leq \delta 2 \leq 0.1$, $0.01 \leq \epsilon 2 \leq 0.1$, $0.5 \leq \zeta 2 \leq 0.7$, $0.25 \leq \omega 2 \leq 0.4$, $0.03 \leq \delta 2 + \epsilon 2 \leq 0.15$, and $\gamma 2 + \delta 2 + \epsilon 2 + \zeta 2 + \omega 2 = 1$.

From the study by the present inventors, it has been found that by defining the composition as described above, at least overwriting can be carried out at a linear velocity of from 1 to 10 m/s, and particularly when used as a rewritable CD compatible medium at a linear speed of from 1 (1.2 to 1.4 m/s) to 6 (7.2 to 8.4 m/s) times of the linear speed of CD, it can be preferably used as a composition excellent in repetitive overwriting durability and archival stability.

Firstly, the composition of $Zn_{\gamma 1}In_{\delta 1}Sb_{\zeta 1}Te_{\omega 1}$, where $0.01 \leq \gamma 1 \leq 0.1$, $0.03 \leq \delta 1 \leq 0.08$, $0.5 \leq \zeta 1 \leq 0.7$, $0.25 \leq \omega 1 \leq 0.4$, and $\gamma 1 + \delta 1 + \zeta 1 + \omega 1 = 1$, will be described.

Zn is used in an amount of at least 1 atomic % to facilitate initialization of an amorphous layer immediately after its formation. If it exceeds 10 atomic %, the archival stability tends to be impaired, such being undesirable. The mechanism whereby initialization is facilitated by the addition of Zn, is not clearly understood. However, it is considered that a fine ZnSb phase will precipitate together with Sb clusters and thus will serve as crystal nuclei.

In is effective to increase the crystallization temperature and to improve the archival stability of an amorphous mark. In order to secure the archival stability at room temperature, at least 3 atomic % will be required. If it exceeds 8 atomic %, phase separation is likely to occur, and segregation by repetitive overwriting is likely to occur, such being undesirable.

Particularly, in order to provide a satisfactory archival stability, it is used in an amount of from 5 atomic % to 8 atomic %, and in order to provide a satisfactory repetitive overwriting property, it is used in an amount of from 3 atomic % to 5 atomic %. If its amount exceeds 5 atomic %, the segregation by repetitive overwriting is likely to occur although a satisfactory archival stability is secured. However, it does not cause any problem to a rewritable CD which requires about 1,000 repetitions. A desired composition is decided depending on an aimed property of a product design.

By adding Zn and In to the SbTe eutectic composition, it is possible to shorten the crystallization time in the after-mentioned initialization operation, while maintaining the archival stability of an amorphous mark. By the addition of Zn and In, the composition in which matrix SbTe forms eutectic, will shift from $Sb_{70}Te_{30}$ to a level of from $Sb_{60}Te_{40}$ to $Sb_{65}Te_{35}$. Accordingly, the linear velocity dependency will be determined by an excess amount of Sb based on this composition.

As mentioned above, to attain a capability for recording at a high linear velocity, the excess amount of Sb may be increased. However, if it is increased too much, the stability of recorded amorphous marks will be impaired. Accordingly, the amount of Sb is $0.5 \leq \zeta 1 \leq 0.7$, and the amount of Te is $0.25 \leq \delta 1 \leq 0.4$. More preferably, the amount of Sb is $0.55 \leq \zeta 1 \leq 0.65$.

Now, the composition of $Zn_{\gamma 2}In_{\delta 2}Ma_{\epsilon 2}Sb_{\zeta 2}Te_{\omega 2}$, where Ma is at least one member selected from Sn, Ge, Si and Pb, $0.01 \leq \gamma 2 \leq 0.1$, $0.001 \leq \delta 2 \leq 0.1$, $0.01 \leq \epsilon 2 \leq 0.1$, $0.5 \leq \zeta 2 \leq 0.7$, $0.25 \leq \omega 2 \leq 0.4$, $0.03 \leq \delta 2 + \epsilon 2 \leq 0.15$, and $\gamma 2 + \delta 2 + \epsilon 2 + \zeta 2 + \omega 2 = 1$, will be described.

Zn is added for the purpose of facilitating initialization of an amorphous layer immediately after its formation, and it is used in an amount of at least 1 atomic %. If it exceeds 10 atomic %, the archival stability will be impaired, such being undesirable.

Both In and Ma, where Ma is at least one member selected from Sn, Ge, Si and Pb, have an effect of increasing the crystallization temperature thereby to improve the archival stability. By adding both of them simultaneously in small amounts, it is possible to obtain a large effect while complementing drawbacks which are likely when they are used alone respectively.

When In is added alone, at least 3 atomic % will be required to secure the storage stability at room temperature, and if it exceeds 5 atomic %, the phase separation is likely to occur, and segregation is likely to occur by repetitive overwriting, such being undesirable. If the amount of In added is not more than 5 atomic %, a durability corresponding to at least 10,000 times of repetitive overwriting can be obtained, but the archival stability of an amorphous mark tends to be inadequate.

On the other hand, when Ma is added alone, at least 3 atomic % is required to improve the archival stability, but if it exceeds 10 atomic %, initial crystallization abruptly tends to be difficult.

By adding both In and Ma simultaneously in small amounts, it is possible to improve the thermal stability of the amorphous state and improve the archival stability of amorphous recording bits, without bringing about a difficulty in the initialization operation or without bringing about segregation by repetitive overwriting.

That is, when In is added alone in an amount of at least 5 atomic %, the segregation by repetitive overwriting occurs gradually and erasing (recrystallization) tends to become difficult. Ma is added in order to avoid this tendency and to improve archival stability and repetitive overwriting durability.

The total amount of In and Ma is from 3 to 15 atomic %. If it is less than 3 atomic %, the effect for improving the archival stability tends to be inadequate, and if it exceeds 15 atomic %, segregation by repetitive overwriting, or difficulty in initialization, will be brought about, even when Ge or In is added in any proportion.

Further, if In or Ma exceeds 10 atomic %, the same problems as described above are like to result. Therefore, the amount of each of them is at most 10 atomic %. More preferably, the content of In is at most 5 atomic %.

It is preferred to use Ge as Ma, since segregation or deterioration in the crystallization speed is thereby less likely.

By adding Zn, In and Ma to the SbTe eutectic composition, it is possible to shorten the crystallization time in the after-mentioned initialization operation, while maintaining the archival stability of an amorphous mark. By the addition of Zn, In and Ma, the composition in which matrix SbTe forms eutectic, will shift from $Sb_{70}Te_{30}$ to a level of $Sb_{60}Te_{40}$ to $Sb_{65}Te_{35}$. Accordingly, the linear velocity dependency is determined by the excess amount of Sb based on this composition.

To attain a capability for recording at a high linear velocity, the excess amount of Sb may be increased as described above. However, if it is increased too much, stability of recorded amorphous marks tends to be impaired. Accordingly, the amount of Sb is $0.5 \leq \zeta 2 \leq 0.7$, and the amount of Te is $0.25 \leq \delta 2 \leq 0.4$. More preferably, the amount of Sb is $0.55 \leq \zeta 2 \leq 0.65$.

In the present invention, addition of Ma is effective to further improve the characteristics of the recording medium, but tends to slightly increase the cost for materials. Therefore, the decision for its addition or against its addition is made depending upon the cost performance.

It has been reported that by adding Ag and In simultaneously to a composition in the vicinity of the $Sb_{70}Te_{30}$ eutectic composition, it is possible to facilitate the initialization by Ag and to improve the archival stability by In at the same time (JP-A-4-232779, JP-A-5-185732, and JP-A-8-267926). However, each of such reports is directed to a very limited scope and does not teach or suggest the composition or the combination of elements of the present invention.

It has been mentioned above that in usual initialization of an alloy in the vicinity of the eutectic composition, i.e. in the initialization by crystallizing the recording layer in a solid phase at a temperature of at least the crystallization temperature, the crystallization is rather slow, and the productivity is not good.

This is believed attributable to the fact that the recording layer undergoes phase separation from the amorphous state immediately after its formation (as deposited) to form a stable crystalline state. For this phase separation, heating for at least 1 $\mu$sec. is required in the solid state (lower than the melting point).

For example, if initial crystallization of a medium using e.g. $Ge_{10}Sb_{66}Te_{24}$ as the recording layer, is attempted under such a condition that when $Ge_2Sb_2Te_5$ is employed as a recording layer, the medium in the as-deposited state can be crystallized at a sufficiently high speed, substantial portions tend to remain in an amorphous state without being crystallized. If this operation is repeated a few tens times, the phase separation may be completed, and the initialization may thus be accomplished. However, such is not practical, as the productivity is low. However, once initialization has been done, subsequent crystallization (erasing) can be carried out at a high speed.

One of the reasons why the recording layer in the as-deposited state is hardly crystallizable is believed to be such that the as-deposited amorphous state is hardly crystallizable as is different from the amorphous state of recorded marks. Further, the fact that there are no substantial crystal nuclei in the recording layer in the as-deposited state, may be a reason for the difficult crystallizability.

In fact, when a portion treated for initial crystallization is observed by an optical microscope, crystallized sections are observed in the form of separate islands with high reflectance. This is understandable if it is assumed that crystallization has proceeded only at the sections where crystal nuclei were present.

In the present invention, the above difficulty in initialization has been overcome by adding Zn in a proper amount as described above. The present inventors have further found that as a method for carrying out the initialization in a short period of time, melt initialization is effective for the recording layer of the present invention. This is effective to remarkably increase the crystal growth rate.

So long as the layer structure of the medium is properly adjusted, and the initialization conditions are properly set, the recording medium will not immediately be destroyed even when it is melted. For example, melting may be limited to the center portion of a beam by local heating by means of a light beam (a gas laser beam or a semiconductor laser beam) focused in e.g. an oval shape with a long axis of from 50 to a few hundreds $\mu$m and a short axis of from 1 to 10 $\mu$m.

In addition, the melted portion is heated by remaining heat along the periphery of the beam, whereby the cooling rate tends to be low, and crystallization will be adequately carried out. The melt initialization itself is a known method. However, the present inventors have found that this method is particularly effective for the recording medium of the present invention. Namely, by this method, the time for initialization can be shortened to one tenth as compared with conventional solid phase crystallization, whereby the productivity is increased to a large extent.

Further, the melt initialization provides an effect of preventing a change in the crystallizability during erasing after overwriting.

As schematically shown in FIG. 1, the layer structure of the disk in the present invention is such that at least a lower protective layer 2, a phase-change type recording layer 3, an upper protective layer 4 and a reflective layer 5 are formed on a substrate 1. The protective layers 2 and 4, the recording layer 3 and the reflective layer 5 are formed by e.g. a sputtering method. With a view to preventing oxidation or contamination among the respective layers, it is preferred to carry out the layer forming in an in-line apparatus wherein the target for the recording layer, the targets for the protecting layers, and if necessary, the target for the reflective layer, are disposed in the same vacuum chamber. Further, this is advantageous from the viewpoint of the productivity.

On the reflective layer 5, it is preferred to form a protective coating layer made of an ultraviolet curable or thermosetting resin to prevent scratching, to prevent deformation by repetitive overwriting or to improve corrosion resistance. The protective coating layer is usually applied by a spin coating method and preferably has a thickness of from 1 to 10 $\mu$m.

In the present invention, the substrate 1 of the recording medium may be made of any material such as glass, plastic or glass provided with a photocurable resin. From the viewpoint of the productivity including costs, plastic is preferred. Particularly preferred is a polycarbonate resin.

The thickness of the phase-change type recording layer 3 of the present invention is preferably within a range of from 15 to 30 nm. If the thickness is less than 15 nm, no adequate contrast tends to be obtained, and the crystallization speed tends to be slow, whereby it tends to be difficult to carry out erasing of record in a short period of time. On the other hand, if the thickness exceeds 30 nm, the heat capacity tends to be large, whereby the recording sensitivity tends to be poor.

The materials for the upper and lower protective layers 2 and 4 are determined taking into consideration the refractive indices, the thermal conductivities, the chemical stability, the mechanical strength, the adhesion, etc. In general, an oxide, sulfide, nitride or carbide of e.g. Mg, Ca, Sr, Y, La, Ce, Ho, Er, Yb, Ti, Zr, Hf, V, Nb, Ta, Zn, Al, Si, Ge or Pb, or a fluoride of Ca, Mg or Li having high transparency and high melting point, can be used. These oxides, sulfides, nitrides, carbides and fluorides may not necessarily take stoichiometrical compositions. It is effective to control the compositions to adjust the refractive indices or the like, or to use them in admixture. From the viewpoint of the repetitive recording characteristic, a dielectric mixture is preferred. More specifically, a mixture of ZnS or a rare earth sulfide with a heat resistant compound such as an oxide, nitride or carbide, may be mentioned.

The lower protective layer 2 preferably has a thickness of at least 50 nm, since it is also required to have a function of suppressing a thermal deformation of the plastic substrate. On the other hand, if it exceeds 500 nm, cracking is likely to result due to an internal stress, such being undesirable. The thickness is usually selected within such a range so that the reflectivity, the difference in reflectivity between before and after recording and the phase difference become proper levels taking the light interference effect into consideration.

Particularly preferred is such that the portion of the lower protective layer in a thickness of from 1 to 10 nm on the side which is in contact with the recording layer, is made of a mixture comprising a chalcogen compound and a heat resistant compound having a decomposition temperature or melting point of at least 1,000° C., which is not a chalcogen compound, and the remaining portion is made of a heat resistant compound of the type which is the same or different from the above heat resistant compound.

The chalcogen compound may, for example, be a sulfide of a Group IIa element such as MgS, CaS, SrS or BaS, a sulfide of a rare earth, such as $La_2S_3$ or $Ce_2S_3$, or a selenium compound of a Group IIa element such as MgSe, CaSe, SrSe or BaSe.

The above sulfides or selenium compounds contain chalcogen elements and thus have good adhesion with chalcogen elements mainly contained in the phase-change type recording layer and with the surrounding elements. Thus, a substantial improvement is observed as compared with a case where a dielectric layer made merely of an oxide is employed.

The heat resistant compound other than the chalcogen compound, may, for example, be an oxide of Al, Si, Ge, Y, Zr, Ba, Ta, Nb, V, W, Hf, Sc or a lanthanoid, a nitride of Al, Si, Ge, Ta or B, a fluoride of Mg, Ca, Nd, Tb or La, or a carbide of Si or B.

When a fluoride is used among them, it is preferred to use an oxide in combination, so that the brittleness may be overcome.

From the viewpoint of the costs and efficiency for the production of targets, it is preferred to employ silicon dioxide, yttrium oxide, barium oxide, tantalum oxide, $LaF_3$, $NdF_3$, $TbF_3$, SiC, $Si_3N_4$ or AlN.

The total amount of the above two types of compounds in the protective layer, is preferably at least 50 mol %, more preferably at least 80 mol %. If their content is less than 50 mol %, the effect for preventing deformation of the substrate or the recording layer tends to be inadequate, and the layer tends to be useless as a protective layer.

The content of the chalcogen compound is preferably from 10 to 95 mol % of the entire protective layer. If the content is less than 10 mol %, the desired property tends to be hardly obtainable. On the other hand, if it exceeds 95 mol %, the optical absorption coefficient tends to be large, such being undesirable. The content is more preferably from 15 to 90 mol %.

The content of the above heat resistant compound is preferably from 5 to 90 mol % in the entire dielectric layer, more preferably at least 10 mol %. If the content is outside this range, the desired property may not sometimes be obtained.

The heat resistant compound is required to have a heat resistance of at least 1,000° C., and at the same time, required to be optically adequately transparent to the laser beam to be used for recording and retrieving. Namely, in a thickness of about 50 nm, the imaginary part of the complex refractive index in a wavelength region of at least about 600 nm is desired to be at most 0.05.

To obtain such optical transparency, it is preferred to use a gas mixture of Ar with oxygen and/or nitrogen during the sputtering for forming the layer.

S or Se in a sulfide or a selenium compound has a high vapor pressure, and a part thereof tends to evaporate or undergo decomposition during the sputtering. If such deficiency of S or Se in a protective layer becomes substantial, the optical absorptivity tends to be defective, and the protective layer tends to be chemically unstable. Addition of oxygen or nitrogen to the sputtering gas as mentioned above, is intended to replace such deficiency with oxygen or nitrogen. Here, an oxide or nitride of the metal element of the above chalcogen compound will be formed partially in the film, but such an oxide or nitride serves as a part of the heat resistant compound, whereby the properties of the film will not be impaired.

This dielectric layer is usually prepared by high frequency discharge sputtering, whereby the layer-forming speed tends to be slow, and from the viewpoint of the productivity, it is not desirable to form a thick layer of at least 200 nm. Accordingly, in a case where it is required to form a thick layer, such a protective layer should preferably have a structure such that the portion thereof in a thickness of from 1 to 10 nm on the side which is in contact with the recording layer, is made of a mixture comprising a chalcogen compound and a heat resistant compound having a decomposition temperature or melting point of at least 1,000° C., and the remaining portion is made of a heat resistant compound of the type which is the same or different from the above heat resistant compound.

So long as the dielectric layer of this composition is used at least on the interface side with the recording layer, the same effect is obtainable as in the case where the layer in its entire thickness is made of a dielectric layer of the composition of the present invention.

However, if the adhesion is poor between the composite dielectric layer on the interface side of the recording layer and the protective layer of a heat resistant compound to be formed thereon, peeling is likely to occur. Accordingly, a due care is required for the combination of the materials. The most problem-free combination may be such that the same material as the heat resistant compound contained in the composite dielectric layer on the interface side with the recording layer, is used for the protective layer of a heat resistant compound to be formed thereon.

The thickness of the upper protective layer 4 is preferably from 10 to 50 nm. The most important reason is that heat dissipation to the reflective layer 5 is most efficiently be carried out. By adopting a multilayer structure to accelerate the heat dissipation and to increase the cooling rate for resolidification of the recording layer, a high erasing ratio can be accomplished by high speed crystallization while avoiding problems involved in recrystallization. Such a multilayer structure is called "a rapid cooling structure".

Although it may depend on the thermal conductivity of the upper protective layer, the thermal conductivity of a thin layer of less than 100 nm is usually smaller by at least 2 or 3 figures than the thermal conductivity of bulk and is not so different, and therefore, the thickness will be an important factor.

If the thickness of the upper protective layer is thicker than 50 nm, the time until the heat of the recording layer reaches the reflective layer, tends to be long, whereby the heat dissipating effect by the reflective layer may not effectively be obtained.

On the other hand, if the upper protective layer is thinner than 10 nm, it is likely to break due to e.g. deformation during melting of the recording layer, such being undesirable. This is undesirable also from such a viewpoint that the heat dissipating effect tends to be too large, and the power required for recording tends to be unnecessarily large.

The reflective layer 5 preferably has a thickness of from 50 to 500 nm and is made of a metal containing at least 90 atomic % of Au, Ag or Al and having a volume resistivity of from 20 to 300 n$\Omega \cdot$m.

The reflective layer is preferably made of a material having a high reflectivity, and in order to secure rapid cooling of the recording layer of the present invention, it is advisable to use a material having a high thermal conductivity so that the heat dissipating effect can be expected even via the upper dielectric layer.

The thermal conductivity of a thin layer is usually substantially smaller than the thermal conductivity of bulk. Especially when the thickness is less than 40 nm, it may happen that the thermal conductivity decreases by at least 1 figure due to an influence of the island structure at the initial stage of growth of the layer, such being undesirable. However, it is rather difficult to measure the thermal conductivity of a thin film, and the reproducibility of measurement is questionable. For example, the crystallizability or the amount of impurities is likely to be different depending upon the layer-forming condition, whereby the thermal conductivity may be different even with the same composition.

Therefore, the present inventors have decided to measure the electrical resistance of the reflective layer instead of the thermal conductivity.

With a material wherein mainly electrons govern the heat or electrical conductivity, like a metal layer, the thermal conductivity and the electrical conductivity are in a good proportional relationship, so that the degree of the thermal conductivity can be estimated by means of the electrical resistance.

The electrical resistance of a thin layer can be represented by a resistivity stipulated by its thickness or area of the measured region. For example, the volume resistivity and the sheet resistivity can be measured by a common four probe method, and they are prescribed in JIS K7194.

By such a resistivity, data can be obtained far more simply and with far better reproducibility than the actual measurement of the thermal conductivity itself. The lower the volume resistivity, the higher the thermal conductivity.

In the present invention, a preferred reflective layer has a volume resistivity of from 20 to 300 n$\Omega \cdot$m.

As a thin layer having a volume resistivity of from 20 to 300 n$\Omega \cdot$m, substantially pure Al, Au or Ag metal or alloy having an impurity content of not more than 10 atomic % (inclusive of pure Al, Au or Ag) may, for example, be mentioned.

An example of a preferred Al alloy is an Al-Mg-Si alloy containing from 0.3 to 0.8 wt % of Si and from 0.3 to 1.2 wt % of Mg as additives. This alloy is preferred, as it has already been used as a sputtered film for a reflective layer for CD or a circuit material for IC. Further, it is known that with an Al alloy containing at least 0.2 and less than 2 atomic % of Ta, Ti, Co, Cr, Si, Sc, Hf, Pd, Pt, Mg, Zr, Mo or Mn as an additive, the volume resistivity increases, and the hillock resistance is improved (Journal of Japanese Metal Association, vol. 59 (1995) p.674–678, J. Vac, Sci, Tech, Al4 (1996) p.2728–2735, etc.), and such an alloy may be used in consideration of the durability, the volume resistivity and the layer-forming speed.

With the Al alloy, if the amount of additive is less than 0.2 atomic %, the hillock resistance tends to be inadequate in many cases, although such may depend upon the layer-forming conditions.

When the archival stability is of importance, the additive component is preferably Ta.

On the other hand, as a preferred Ag alloy, the one containing at least 0.2 atomic % of Ti, V, Ta, Nb, W, Co, Cr, Si Ge, Sn, Sc, Hf, Pd, Rh, Au, Pt, Mg, Zr, Mo or Mn as an additive, is preferred.

When the archival stability is of importance, the additive component is preferably Ti or Mg.

The present inventors have confirmed that with the additive element to Al or the additive element to Ag, the volume resistivity increases in proportion to the concentration of the additive element.

Usually it is considered that addition of an impurity tends to reduce the crystal particle size and to increase electron scattering at grain boundary to lower the thermal conductivity. It is necessary to adjust the amount of the added impurity in order to obtain the high thermal conductivity of the material itself by increasing the crystal particle size.

Further, the reflective layer is usually formed by a sputtering method or a vacuum deposition method, whereby the total amount of impurities is required to be less than 2 atomic % including the amounts of impurities in the target or the vapor deposition material itself and the moisture and the oxygen amount entered during the layer-forming operation.

Therefore, the background pressure of the process chamber is preferably at most $1 \times 10^{-3}$ Pa.

When the layer-forming is carried out under the background pressure of at least $1 \times 10^{-4}$ Pa, the layer-forming rate is preferably adjusted to be at least 1 nm/sec, preferably at least 10 nm/sec, thereby to prevent inclusion of impurities.

Otherwise, when the additional element is intentionally contained in an amount of more than 1 atomic %, it is advisable to adjust the layer-forming rate at a level of at least 10 nm/sec thereby to minimize inclusion of additional impurities.

A layer-forming condition such as pressure may affect the crystal particle size. For example, in an alloy layer having Ta added in an amount of about 2 atomic % to Al, an amorphous phase may be present between crystal particles, and the proportions of the crystalline phase and the amorphous phase depend upon the layer-forming condition. Namely, the lower the pressure for sputtering, the larger the proportion of the crystalline phase, the lower the volume resistivity (the higher the thermal conductivity).

A method for preparation of the alloy target used for sputtering and the sputtering gas (Ar, Ne, Xe or the like) will also affect the crystallizability or the impurity composition in the layer.

Therefore, even if the above Al alloy composition is disclosed as a material for the reflective layer (such as JP-A-3-1338, JP-A-1-169571 or JP-A-1-208744), such a composition does not necessarily show the multilayer structure with the volume resistivity as defined by the present invention.

The thickness of the reflective layer is preferably at least 50 nm to completely reflect the incident light without transmission of light. If the thickness exceeds 500 nm, the productivity tends to be poor with no further improvement in the heat dissipating effect, and cracking tends to occur. Therefore, the thickness is. preferably at most 500 nm. When the thickness of the upper protective layer is from 30 to 50 nm, in order to impart high thermal conductivity to the reflective layer, the amount of impurities is adjusted to be at most 2 atomic %.

In the present invention, this rapid cooling structure is used in combination with the following recording method to accurately control the cooling rate during resolidification of the recording layer, whereby it is possible to fully attain the feature of the recording layer material of the present invention suitable for mark length recording.

Figure 2:
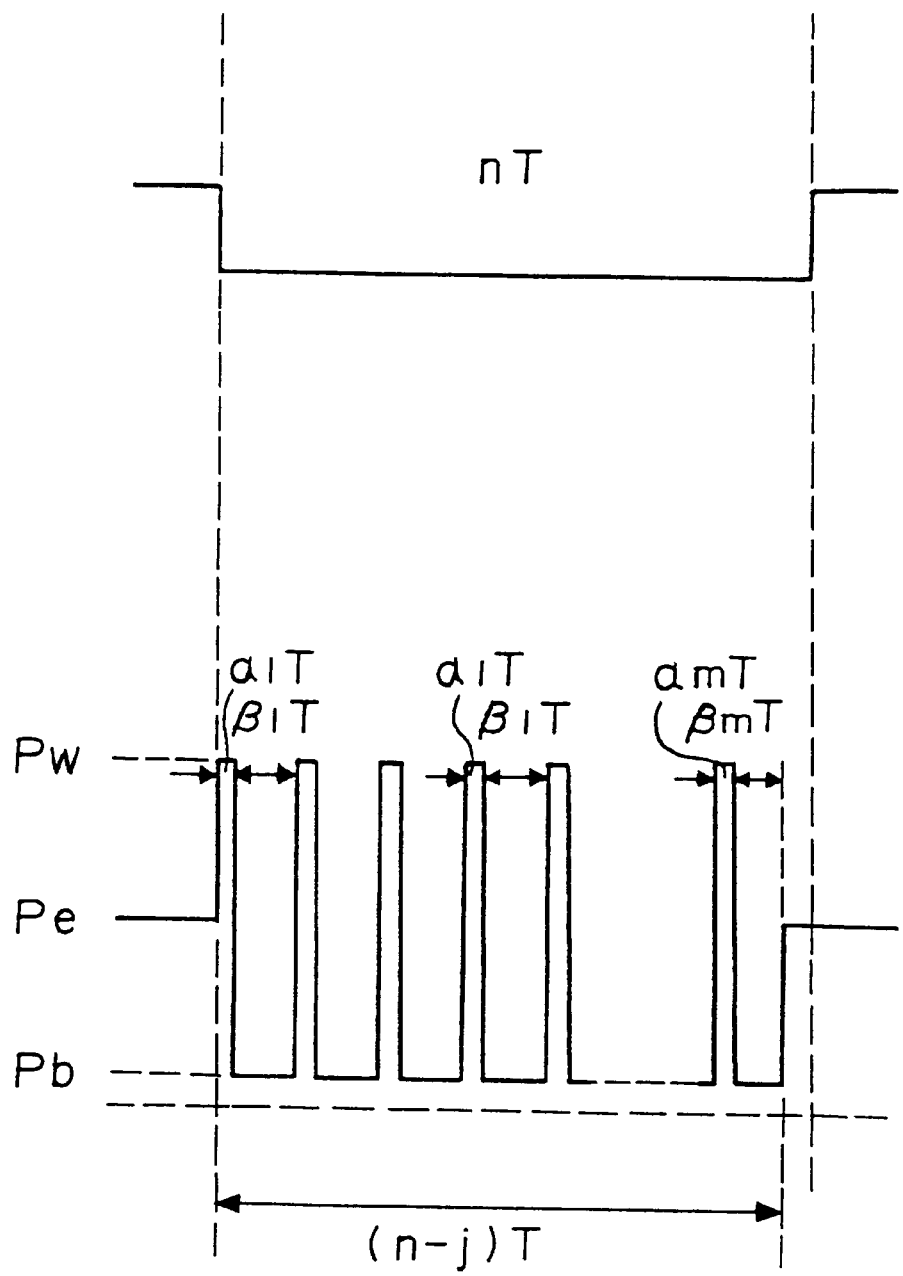
FIG. 2 is a view showing an example of the irradiation pattern of a laser power during optical recording on the optical recording medium of the present invention.

FIG. 2 is a view illustrating one embodiment of the irradiation pattern of a laser power during optical recording in the mark length modulation recording. The Figure illustrates an embodiment wherein an amorphous mark having a length nT, where T is a clock period, and n is a natural number of at least 2, is formed so that nT represents a mark length obtainable in the mark length modulation recording.

When a mark having a length nT is recorded to the recording medium of the present invention, the laser application period is divided into m=n−k (k is an integer of $0 \leq k \leq 2$, provided that $n_{min}-k \geq 1$, where $n_{min}$ is the minimum value of n) recording pulses, whereby each recording pulse width (the period for application of writing power Pw) is represented by $\alpha_i T$, and an off-pulse period of time represented by $\beta_i T$ is attached to each recording pulse. Here, k is a parameter form to take a value smaller than n. For example, when n=3, m may take a value of 1, 2, or 3. During the off-pulse period, bias power Pb of $0 < Pb \leq 0.5Pe$ is applied, (provided that when $2 \leq i \leq m-1$, $\alpha_i \leq \beta_i$).

Here, so that an accurate nT mark can be obtained at the time of retrieving the amorphous mark, the laser application period can be adjusted as follows:

$\alpha_i + \beta_i + \ldots + \alpha_m + \beta_m = n-j$, where j is a real number of $0 \leq j \leq 2$. Here, j is a parameter for shortening the application period of recording power to prevent an effect of heating by the final pulse.

With the medium of the present invention, it is preferred to carry out recording/erasing by a three power level modulation wherein the above-mentioned off-pulse period is provided for bias power Pb, rather than by a two power level modulation with writing power Pw and erasing power Pe as heretofore employed in a conventional GeTe-Sb$_2$Te$_3$ pseudo binary alloy system. Overwriting by the two power level modulation may be used, but by employing the three power level modulation system, the power margin and the linear velocity margin for recording can be broadened.

With the recording layer of the present invention, it is particularly preferred to adjust bias power Pb for the off-pulse period to a sufficiently low level so that $0 \leq Pb \leq 0.5Pe$. However, at $\beta_m T$, $0 \leq Pb \leq Pe$ is acceptable.

Further, erasing power Pe is a power which is capable of accomplishing recrystallization of amorphous mark portions, and writing power Pw is a power which is sufficient for melting the recording layer in a time of $\alpha_i T$ and Pw>Pe.

Figure 3:
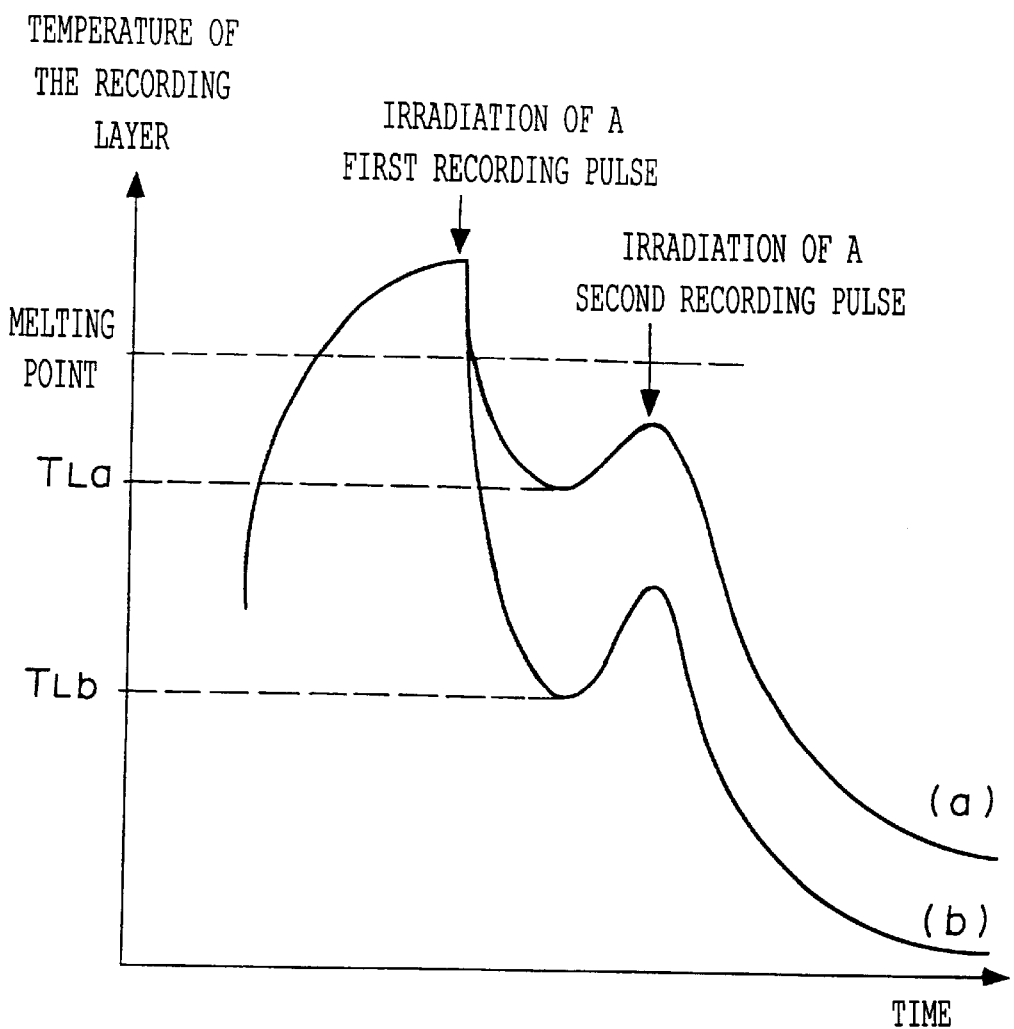
FIG. 3 is a graph showing the temperature change of the recording layer when optical recording was carried out on the optical information recording medium of the present invention.

FIG. 3 is a schematic graph illustrating the temperature change of the recording layer when optical recording is carried out on the medium of the present invention. This is a case wherein the laser application period is divided into two (m=2), and a first recording pulse (writing power), a first off-pulse (bias power), a second recording pulse and a second off-pulse are sequentially irradiated to form an amorphous mark, and (a) represents a case where $\alpha_i = \beta_i = 0.5$, and Pb=Pe, and (b) represents a case where $\alpha_i = \beta_i = 0.5$, and Pb is substantially 0 (provided that P≠0).

As the recording position, a position of the recording layer where the rear end of the first recording pulse is irradiated, is assumed.

In the case of (a), even during the off-pulse period, Pe is applied, whereby the influence of the heating by the subsequent recording pulse extends forwardly, and the cooling rate after irradiation of the first recording pulse is low, and the lowest temperature $T_{La}$ to which the temperature reaches by the temperature drop during the off-pulse period, is still in the vicinity of the melting point.

On the other hand, in the case of (b), Pb during the off-pulse period is substantially 0, whereby the lowest temperature $T_{Lb}$ will be sufficiently lower than the melting point, and the cooling rate is high. The amorphous mark area is melted during irradiation with the first recording pulse and then is formed by quenching during the subsequent off-pulse period.

As mentioned above, in the medium of the present invention, the recording layer shows a high crystallization speed only in the vicinity of the melting point.

Accordingly, to take the temperature profile as shown by (b) in FIG. 3, is important to suppress recrystallization and to obtain a good amorphous mark.

In other words, by controlling the cooling rate and the lowest temperature $T_L$, it is possible to completely control the recrystallization and to form an amorphous mark having a clear outline which substantially corresponds to the melted region, whereby a low jitter is attainable at the edge of the mark. In the above recording pulse dividing method, $0 \leq Pb \leq 0.2Pe$ is more preferred. However, at $\beta_m T$, $0 \leq Pb \leq Pe$ is acceptable.

Further, it is more preferred that when $2 \leq i \leq m-1$, $\alpha_i + \beta_i = 1.0$, and $0.05 \leq \alpha_i \leq 0.5$, since it is thereby possible to effectively obtain the cooling effect during the off-pulse period.

On the other hand, with a $GeTe-Sb_2Te_3$ pseudo-binary alloy, there is no substantial difference in the amorphous mark-forming process whether either temperature profile (a) or (b) in FIG. 3 is used. Because it shows recrystallization within a wide temperature range, although the speed is somewhat slow. In such a case, irrespective of the divided pulse method, recrystallization takes place to some extent, whereby coarse grains will form along the periphery of the amorphous mark, thus deteriorating the jitter at the edge of the mark. With this recording layer composition, it is advisable to carry out overwriting by conventional simple two power level modulation rather than adopting the off pulse.

Namely, for the recording layer of the present invention, the off-pulse is suitable, but such off-pulse is not necessarily suitable when applied to conventional $GeTe-Sb_2Te_3$ type recording layer or when the recording layer of the present invention is applied to the mark position recording as shown in Examples of JP-A-1-303643.

As mentioned above, there has been some cases wherein an alloy having a composition close to the SbTe eutectic is disclosed, but nothing is disclosed with respect to the application of the recording method suitable for mark length recording as disclosed by the present invention.

Thus, the composition and the multilayer structure of the medium of the present invention represent indispensable improvements to make the alloy close to the $Sb_{70}Te_{30}$ eutectic composition useful for a practical phase-change medium.

Further, the present invention is very important also from the viewpoint that the composition which used to be considered difficult to initialize and impractical as a recording layer, has been found to be suitable for high density recording once it has been initialized.

Still further, it is industrially important that an initialization method suitable for the recording medium of the present invention has been found to carry out initialization in a short period of time.

Now, the second aspect of the present invention will be described. The composition of the recording layer of the second aspect of the present invention is the one having a predetermined amount of Ge and a predetermined amount of Ag or Zn added to the same base close to the $Sb_{70}Te_{30}$ eutectic composition as in the first aspect of the present invention.

The most important merit of employing the material for the recording layer of the present invention is that it provides a high crystallization speed, and it is thereby possible to suppress a phenomenon such that coarse grains having a reflectivity different from the initialized state will form in the periphery of an amorphous mark or in the erased mark.

The composition of the recording layer of this invention is represented by the following formula. Namely, it is represented by $Mb_z Ge_y (Sb_x Te_{1-x})_{1-y-z}$, where Mb is at least one member selected from Ag and Zn, $0.60 \leq x \leq 0.85$, $0.01 \leq y \leq 0.20$, and $0.01 \leq z \leq 0.15$.

Addition of Ge is effective particularly for improving the thermal stability of the amorphous state and for increasing the archival stability of recorded amorphous marks.

If the amount of Ge exceeds 20 atomic %, an intermetallic compound composition such as $Ge_1Sb_4Te_7$, $Ge_1Sb_2Te_4$, $Ge_2Sb_2Te_5$ or GeTe, tends to undergo phase separation, and the composition is likely to change by repetitive overwriting, such being undesirable. More preferably, it is at most 15 atomic %. On the other hand, if it is less than 1 atomic %, no substantial effect of addition will be obtained.

Ag and Zn may be employed alone or in combination in an amount of at least 1 atomic %, to facilitate initialization of the amorphous layer immediately after its formation. If it exceeds 15 atomic %, the effect for stabilizing amorphous bits obtainable by the addition of Ge tends to be lost. Further, the jitter of the recorded mark edge deteriorates probably due to precipitation of a new alloy phase, such being undesirable. Preferably, the amount is at most 10 atomic %.

By adding Ge, Ag and Zn to the SbTe eutectic composition, it is possible to shorten the crystallization time in the after-mentioned initialization operation, while maintaining the archival stability of an amorphous mark. By the addition of Ge, Ag and Zn, the composition of matrix SbTe to form eutectic will shift from $Sb_{70}Te_{30}$ to a level of $Sb_{60}Te_{40}$ to $Sb_{65}Te_{35}$. Accordingly, the linear velocity dependency will be determined by the excess amount of Sb based on this composition.

To attain a capability for recording at a high linear velocity, the excess amount of Sb may be increased as described above. However, if it is increased too much, the stability of the recorded amorphous marks tends to be impaired. Therefore, with respect to $Sb_x Te_{1-x}$, $0.60 \leq x \leq 0.85$, preferably $0.65 \leq x \leq 0.80$.

For the medium of this invention, melt initialization is effective as in the case of the first aspect of the present invention. Further, a crystallization accelerating layer may be formed.

The medium of this second aspect of the present invention has a multilayer structure as shown in FIG. 1, like the first aspect of the invention. The thickness of the phase-change type recording layer 3 is preferably from 15 to 30 nm. If the thickness is thinner than 15 nm, no adequate contrast tends to be obtainable, and the crystallization speed tends to be slow, whereby it will be difficult to carry out erasing of record in a short period of time. On the other hand, if it is thicker than 30 nm, the heat capacity tends to be large, and the recording sensitivity tends to be poor.

The materials for the upper and lower protective layers 2 and 3 may be the same as in the first aspect of the present invention.

The lower protective layer 2 is required to have a function of suppressing a heat deformation of a plastic substrate. Accordingly, the thickness is preferably at least 50 nm. On the other hand, if it exceeds 500 nm, cracking is likely to result due to an internal stress. Accordingly, the thickness is usually selected within this range, so that the reflectivity, the difference in reflectivity between before and after recording, and the phase difference will be proper levels taking into the light interference effect into consideration.

The thickness of the upper protective layer 4 is preferably from 10 to 50 nm. The most important reason is that heat dissipation to the reflective layer 5 is most efficiently be carried out. By adopting a multilayer structure to accelerate the heat dissipation and to increase the cooling rate for resolidification of the recording layer, a high erasing ratio can be accomplished by high speed crystallization, while avoiding problems involved in recrystallization.

If the thickness of the upper protective layer is thicker than 50 nm, the time until the heat of the recording layer reaches the reflective layer, tends to be long, whereby the heat dissipating effect by the reflective layer may not effectively be obtained.

Although it may depend upon the thermal conductivity of the upper protective layer, the thermal conductivity of a thin layer of less than 100 nm is usually smaller by 2 to 3 orders of magnitude from the thermal conductivity of bulk and has no substantial difference. Accordingly, the thickness of the protective layer becomes an important factor.

On the other hand, if the upper protective layer is thinner than 10 nm, it is likely to break due to e.g. deformation during melting of the recording layer, such being undesirable. This is undesirable also from such a viewpoint that the heat dissipating effect tends to be too large, and the power required for recording tends to be unnecessarily large.

The reflective layer is preferably made of a material having a large reflectivity, and for the recording layer of the present invention, it is preferred to employ a material which has a particularly high thermal conductivity, so that the heat dissipating effect can be expected even via the upper dielectric layer.

As such a material, a metal containing at least 90 atomic % of Au, Ag or Al, is preferably employed. To control the thermal conductivity and to improve the corrosion resistance, a small amount of e.g. Ta, Ti, Cr, Mo, Mg, V, Nb or Zr may be added. Particularly preferred is an alloy of $Al_bTa_{1-b}(0<b<0.1)$, since it is excellent in corrosion resistance and improves the reliability of the medium.

The thickness of the reflective layer is preferably at least 50 nm to completely reflect the incident light without transmission of light. If the thickness exceeds 500 nm, the productivity tends to be poor with no further improvement in the heat dissipating effect, and cracking is likely to result. Therefore, thickness is preferably at most 500 nm.

Also in the second aspect of the present invention, the recording method as described in the first aspect of the present invention may preferably be used in combination. It is particularly preferred to employ it in a linear velocity range of 1 to 7 m/s. If the linear velocity is less than 1 m/s, recrystallization is likely, and if it is more than 7 m/s, no adequate erasing ratio tends to be obtained. More preferably, the linear velocity is from 2 to 7 m/s.

Now, the third aspect of the present invention will be described.

As mentioned above, a GeSbTe ternary alloy close to the SbTe eutectic composition has had a problem that the recording pulse pattern dependency and the linear velocity dependency are strong, and when a usual two level modulation pulse pattern is employed, overwriting can normally be carried out only within a narrow linear velocity range.

Namely, at a low linear velocity, recrystallization is so remarkable that formation of an amorphous mark tends to be impaired, and at a high linear velocity, the crystallization speed tends to be inadequate, whereby erasing tends to be inadequate. For example, when an overwriting at 2.8 m/s was applied, normal overwriting can be carried out only within a linear velocity range of 2.8 m/s±50%.

To solve this problem, according to the third aspect of the present invention, a certain specific recording method is combined to a medium having the same multilayer structure as the recording medium according to the first aspect of the present invention, wherein the recording layer is $Ge_f(Sb_dTe_{1-d})_{1-f}$, where $0.60 \leq d \leq 0.85$, and $0.0 \leq f \leq 0.20$, and has a thickness of from 15 to 30 nm, the upper protective layer has a thickness of from 10 to 50 nm, and the reflective layer is made of a metal containing at least 90 atomic % of Au, Ag or Al and has a thickness of from 50 to 500 nm.

The composition of the recording layer according to the third aspect of the present invention is the one having a predetermined amount of Ge added to the same base close to the $Sb_{70}Te_{30}$ eutectic composition as used in the first aspect of the invention.

The most important merit of employing the recording material of this invention is that it has a high crystallization speed, and it is thereby possible to suppress a phenomenon such that coarse grains which are different in the reflectivity from the initialized state will form along the periphery of an amorphous mark or in an erased mark.

The composition of the recording layer of this invention is represented by the following formula. Namely, it is represented by $Ge_f(Sb_dTe_{1-d})_{1-f}$, where $0.60 \leq d \leq 0.85$, and $0.01 \leq f \leq 0.20$.

Adding Ge is effective particularly for improving the thermal stability of the amorphous state and for increasing the archival stability of recorded amorphous marks.

If the amount of Ge exceeds 20 atomic %, an intermetallic compound composition such as $Ge_1Sb_4Te_7$, $Ge_1Sb_2Te_4$, $Ge_2Sb_2Te5$ or GeTe, tends to undergo phase separation, and the composition is likely to change by repetitive overwriting. More preferably, it is at most 15 atomic %. On the other hand, if it is less than 1 atomic %, no substantial effect of addition is obtainable.

As a result of an extensive study on various additive elements to solve a problem of instability of an amorphous mark (the crystallization temperature is as low as from 100 to 150° C., and the storage stability is inadequate) which is problematic with the $Sb_{70}Te_{30}$ binary eutectic system, while maintaining the above-mentioned mechanism for high speed crystallization due to precipitation of Sb clusters, it has been found that addition of a proper amount of Ge increases the crystallization temperature to a level of at least 150° C. and thus has an effect of stabilizing an amorphous mark, without impairing the high speed crystallization.

If the amount of Ge added, is less than 1 atomic %, no adequate effect is obtainable, and in some cases, the crystallization temperature tends to decrease. If the amount of Ge added, exceeds 20 atomic %, other stabilized phase such as GeTe tends to precipitate, whereby the high speed crystallization tends to be impaired, and the crystal particles tend to be coarse, whereby the outline of the amorphous mark tends to be vague, and the jitter tends to increase, such being undesirable. Further, the composition is likely to change due to repetitive overwriting.

The amount is particularly preferably from 2 to 15 atomic %, in order to maintain good properties even after 10,000 times of repetitive overwriting.

By the addition of Ge, the composition for matrix SbTe to form eutectic will shift from $Sb_{70}Te_{30}$ to a level of $Sb_{60}Te_{40}$ to $Sb_{65}Te_{35}$. Accordingly, the linear velocity dependency will be determined by the excess amount of Sb based on this composition.

To attain a capability for recording at a high linear velocity, the excess amount of Sb may be increased as described above. However, if it is increased too much, stability of recorded amorphous marks tends to be impaired. Accordingly, in the case of $Sb_dTe_{1-d}$, $0.60 \leq d \leq 0.85$, preferably $0.65 \leq d \leq 0.75$.

For the medium of this invention, melt initialization is effective like in the first aspect of the invention. Further, a crystallization accelerating layer may be formed.

The medium of this invention has a multilayer structure as shown in FIG. 1, like the first aspect of the invention.

The thickness of the phase-change type recording layer 3 of this invention is preferably within a range of from 15 to 30 nm. If the thickness is thinner than 15 nm, no adequate contrast tends to be obtained, and the crystallization speed tends to be slow, whereby it will be difficult to erase the record in a short period of time. On the other hand, if it is thicker than 30 nm, the heat capacity tends to be large, and the recording sensitivity tends to be poor.

The materials for the upper and lower protective layers 2 and 4 may be the same as used in the first aspect of the invention.

The lower protective layer 2 is required a have a function of suppressing heat deformation of the plastic substrate. Accordingly, the thickness is preferably at least 50 nm. On the other hand, if it exceeds 500 nm, cracking is likely to result due to an inner stress, such being undesirable. Usually, the thickness will be selected within this range, so that the reflectivity, the difference in reflectivity between before and after recording, and the phase difference will be proper levels taking the light interference effect into consideration.

The thickness of the upper protective layer is limited from 10 to 50 nm. The most important reason is such that heat dissipation to the reflective layer 5 is effectively conducted. By adopting a multilayer structure for accelerating heat dissipation and for improving the cooling rate for recrystallization of the recording layer, it is possible to realize a high erasing ratio by high crystallization, while avoiding a problem of recrystallization.

If the thickness of the upper protective layer exceeds 50 nm, the time until the heat of the recording layer reaches the reflective layer tends to be long, whereby the heat dissipating effect by the reflective layer may not effectively be obtained. Preferably, it is at most 30 nm.

Although it may depend upon the thermal conductivity of the upper protective layer, the thermal conductivity of a thin layer of less than 100 nm is usually smaller by 2 to 3 figures than the thermal conductivity of bulk and has no substantial difference. Accordingly, the thickness of the protective layer becomes an important factor.

On the other hand, if the upper protective layer is thinner than 10 nm, it is likely to break due to e.g. deformation during melting of the recording layer, such being undesirable. This is undesirable also from such a viewpoint that the heat dissipating effect tends to be too large, and the power required for recording tends to be unnecessarily large.

The reflective layer is preferably made of a material having a high reflectivity. For the recording layer of the present invention, it is preferred to employ the one having a particularly high thermal conductivity, so that the heat dissipating effect can be expected even via the upper dielectric layer.

As such a material, a metal containing at least 90 atomic % of Au, Ag or Al, is preferably employed. To control the thermal conductivity and to improve the corrosion resistance, a small amount of Ta, Ti, Cr, Mo, Mg, V, Nb or Zr may be added.

Particularly preferred is an alloy of $Al_cTa_{1-c}$ ($0 \leq c \leq 0.1$), it is excellent in corrosion resistance and improves the reliability of the medium.

The thickness of the reflective layer is preferably at least 50 nm to completely reflect the incident light without transmission of light. If the thickness exceeds 50 nm, the productivity tends to be poor with no further improvement in the heat dissipating effect, and cracking is likely to result. Accordingly, thickness is preferably at most 500 nm.

In this invention, the recording method as described in the first aspect of the present invention may be employed in combination in a linear velocity range of from 1 to 7 m/s, whereby the above-described effects can be obtained. If the linear velocity is less than 1 m/s, recrystallization tends to be so remarkable that a proper amorphous mark can not be formed even by using this recording method. If it exceeds 7 m/s, no adequate erasing ratio can be obtained by this recording method. To take a large margin, the linear velocity is more preferably from 2 to 7 m/s.

As mentioned above, with a conventional GeSbTe ternary alloy close to the SbTe eutectic composition, normal overwriting can be carried out only within a linear velocity range of 2.8 m/s±50%. Whereas, by the combination of the recording medium and the recording method of the present invention, excellent overwriting is made possible within a wide linear velocity range.

Further, as another method for solving the difficulty in initialization of $Sb_{70}Te_{30}$ eutectic alloy based recording layer, especially $Gef(Sb_dTe_{1-d})_{1-f}$, where $0.60 \leq d \leq 0.85$, and $0.01 \leq f \leq 0.20$, the present inventors have found it effective to provide a crystallization accelerating layer, whereby the initial crystallization can be completed in a short period of time. As a reason for this effect, it is conceivable, for example, that the crystallization accelerating layer serves as crystal nuclei to promote the crystallization, or that the structure in the as-deposited state of the recording layer formed on the crystallization accelerating layer is different from the case where no crystallization accelerating layer is present, whereby crystallization readily proceeds.

According to the study by the present inventors, the initial crystallization can be facilitated when the crystallization accelerating layer is formed below the recording layer, but the effect tends to be small when the crystallization accelerating layer is formed on the recording layer. This indicates that the effect of the latter reason is predominant.

The crystallization accelerating layer may be made of a readily crystallizable metal such as Au, Ag, Cu or Al, but is preferably the one having a refractive index which is close to the recording layer. Therefore, for the recording layer of the composition of the present invention, the crystallization accelerating layer is preferably of a composition close to $Sb_2Te_3$.

The composition close to $Sb_2Te_3$ is, in many cases, crystalline even in the as-deposited state and likely to form crystal nuclei during the initial crystallization, and it also has a merit that it makes the as-deposited state of the recording layer formed thereon a readily crystallizable state.

The compositional range of the crystallization accelerating layer of $Sb_aTe_{1-a}$ is preferably $0.3 \leq a \leq 0.5$, more preferably $0.35 \leq a \leq 0.45$. Further, an additional element may be incorporated in an amount of at most 10 atomic %. For example, $Ge_1Sb_4Te_7$ or the like is useful for the crystallization accelerating layer.

After recording an amorphous mark after the initialization, the crystallization accelerating layer provided at the time of forming the recording layer is considered to be mixed with other portions of the recording layer.

The crystallization accelerating layer has a composition which is different from the average composition of the recording layer, and as the refractive index is different from the recording layer, the reflectance after the initial crystallization will be different from a case where no crystallization accelerating layer is present, or after the initial crystallization and after repetitive overwriting for e.g. ten times. Accordingly, the crystallization accelerating layer should not be too thick.

If the crystallization accelerating layer is too thick, recorded signals tend to be deteriorated by from 2 to 5 times of overwriting. On the other hand, if it is too thin, the effect for facilitating the initial crystallization tends to be small. Accordingly, the thickness of the crystallization accelerating layer is preferably at least 0.2 nm, more preferably at least 1 nm, and preferably at most 10 nmy more preferably at most 5 nm.

To compensate the difference in composition between the recording layer and the crystallization accelerating layer, it is effective to provide a composition-adjusting layer in contact with the crystallization accelerating layer so that the composition obtained by averaging the compositions of the crystallization accelerating layer and the composition-adjusting layer would be close to the composition of the recording layer.

Now, the present invention will be described in further detail with reference to Examples. In the following Examples, specific embodiments of rewritable CD are described. However, it should be understood that the present invention is by no means restricted to such specific Examples.

For the study of a ZnInSbTe four element alloy recording layer, cosputtering was carried out by means of at least two types of targets i.e. a $Zn_5In_5Sb_{60}Te_{30}$, $Zn_5In_3Sb_{62}Te_{30}$ or $Zn_7In_5Sb_{58}Te_{30}$ alloy target, and a metal or alloy target such as Sb, Zn, InSb or ZnSb.

For the study of a ZnInGeSbTe five element alloy recording layer, cosputtering was carried out by means of at least two types of targets i.e. a $Zn_5In_3Ge_3Sb_{59}Te_{30}$, $Zn_5In_7Ge_5Sb_{53}Te_{30}$ or $Zn_7In_5Sb_{58}Te_{30}$ alloy target, and a metal or alloy target, such as Sb, Ge, Zn, InSb or ZnSb.

For the study of a AgGeSbTe or ZnGeSbTe four element alloy recording layer, cosputtering was carried out by means of at least three types of targets i.e. a $Ge_1Sb_2Te_4$ or $Ge_2Sb_2Te_5$ ternary alloy target, Sb, and Ag or Zn.

By adjusting the discharge powers for the respective targets, the composition was adjusted. The composition of the obtained thin alloy layer was measured by X-ray fluorescence intensity corrected by chemical analysis.

EXAMPLE 1

On a polycarbonate substrate, 85 nm of a $(ZnS)_{80}(SiO_2)_{20}$ layer, 20 nm of a $Zn_5In_5Sb_{60}Te_{30}$ as a recording layer, 20 nm of a $(ZnS)_{80}(SiO_2)_{20}$ layer and 170 nm of a $Al98.5Ta_{1.5}$ alloy layer, were sequentially laminated by magnetron sputtering, and an ultraviolet ray-curable resin was further coated in a thickness of 4 $\mu$m to obtain a disk.

This optical disk was subjected to melt initialization at a linear velocity of 3.5 m/s at a beam-transferring speed (in the radial direction of the disk) of 50 $\mu$m/rotation with a laser power of 550 mW by means of an optical disk initialization apparatus with an elliptic irradiation beam having a long axis of 80 $\mu$m and a short axis of about 1.4 $\mu$m, whereby initial crystallization was carried out by one scanning operation.

On this disk, EFM random signals (clock period: 115 nsec) were recorded at a linear velocity of 2.4 m/s by means of an optical disk evaluation apparatus (laser wavelength: 780 nm, NA: 0.55).

The recording conditions were such that in FIG. 2, $\alpha 1=1$, $\alpha i=0.5$ ($i \geq 2$), $\beta i=0.5$, Pw=13 mW, Pe=6.5 mW, Pb=0.8 mW. Namely, m=n-1, and j=0.5.

The jitter value showing the actual signal characteristic was less than 10% of the clock period with the shortest mark length and thus showed a good result. Further, this characteristic was maintained even after 1,000 times of overwriting. Further, the recorded signals showed no deterioration even after being left for 1,000 hours in an environment wherein the temperature was 80° C. and the relative humidity was 80%.

EXAMPLE 2

On a polycarbonate substrate, 80 nm of a $(ZnS)_{80}(SiO_2)_{20}$ layer, 20 nm of a $Zn_7In_5Sb_{58}Te_{30}$ as a recording layer, 20 nm of a $(ZnS)_{80}S(SiO_2)_{20}$ layer and 170 nm of a $Al_{98.5}Ta_{1.5}$ alloy layer, were sequentially laminated by magnetron sputtering, and an ultraviolet ray-curable resin was further coated in a thickness of 4 $\mu$m to obtain a disk.

This optical disk was subjected to melt initialization at a linear speed of 3.5 m/s at a beam-transferring speed (in the radial direction of the disk) of 50 $\mu$m/rotation with a laser power of 550 mW by means of the same optical disk initialization apparatus as used in Example 1 by irradiating an elliptic light beam with a long axis of 80 $\mu$m and a short axis of about 1.4 $\mu$m. whereby the initial crystallization was carried out by one scanning operation.

On this disk, recording was carried out under the same conditions as in Example 1, followed by evaluation.

The jitter value showing the actual signal characteristic was less than 10% of the clock period with the shortest mark length and thus showed a good result. Further, this characteristic was maintained even after 1,000 times of overwriting. Further, the recorded signals showed no deterioration even after being left for 1,000 hours in an environment in which the temperature was 80° C. and the relative humidity was 80%.

EXAMPLE 3

On a polycarbonate substrate, 80 nm of a $(ZnS)_{80}(SiO_2)_{20}$ layer, 20 nm of a $Zn_5In_3Ge_3Sb_{59}Te_{30}$ layer as a recording layer, 20 nm of a $(ZnS)_{80}(SiO_2)_{20}$ layer and 170 nm of a $Al_{98.5}Ta_{1.5}$ alloy layer, were sequentially laminated by magnetron sputtering, and an ultraviolet ray-curable resin was further coated in a thickness of 4 $\mu$m to obtain a disk.

This optical disk was subjected to melt initialization at a linear velocity of 3 m/s at a beam-transferring speed (in the radial direction of the disk) of 50 $\mu$m/rotation with a laser power of 600 mW by means of the same optical disk initialization apparatus as used in Example 1, whereby initial crystallization was carried out by one scanning operation.

On this disk, recording was carried out under the same conditions as in Example 1, followed by evaluation.

The jitter value showing the actual signal characteristic was less than 10% of the clock period with the shortest mark length and thus showed a good result. Further, this characteristic was maintained even after 2,000 times of overwriting. Further, the recorded signals showed no deterioration even after being left for 1,000 hours in an environment wherein temperature was 80° C. and the relative humidity was 80%.

EXAMPLE 4

On a polycarbonate substrate, 80 nm of a $(ZnS)_{80}(SiO_2)_{20}$ layer, 20 nm of a $Zn_7In_3Ge_3Sb_{58}Te_{29}$ layer as a recording layer, 20 nm of a $(ZnS)_{80}(SiO_2)_{20}$ layer and 200 nm of a $Al_{98.0}Ta_{2.0}$ alloy layer, were sequentially laminated by magnetron sputtering, and an ultraviolet ray-curable resin was further coated in a thickness of 4 μm to obtain a disk.

This optical disk was subjected to melt initialization at a linear velocity of 3 m/s at a beam-transferring speed (in the radial direction of the disk) of 50 μm/rotation with a laser power of 600 mW by means of the same optical disk initialization apparatus as used in Example 1, whereby initial crystallization was carried out by one scanning operation.

On this disk, recording was carried out under the same conditions as in Example 1, followed by evaluation.

The jitter value showing the actual signal characteristic was less than 10% of the clock period with the shortest mark length and thus showed a good result. Further, this characteristic was maintained even after 2,000 times of overwriting. Further, the recorded signals showed no deterioration after being left for 1,000 hours in an environment in which the temperature was 80° C. and the relative humidity was 80%.

COMPARATIVE EXAMPLE 1

On a polycarbonate substrate, 80 nm of a $(ZnS)_{80}(SiO_2)_{20}$ layer, 20 nm of a $Zn_5In_{10}Sb_{60}Te_{25}$ layer as a recording layer, 20 nm of a $(ZnS)_{80}(SiO_2)_{20}$ layer and 200 nm of a $Al_{98.0}Ta_{2.0}$ alloy layer, were sequentially laminated by magnetron sputtering, and an ultraviolet ray-curable resin was further coated in a thickness of 4 im to obtain a disk.

This optical disk was subjected to melt initialization at a linear velocity of 3 m/s at a beam-transferring speed (in the radial direction of the disk) of 50 μm/rotation with a laser power of 600 mW by means of the same optical disk initialization apparatus as used in Example 1, whereby initial crystallization was carried out by one scanning operation.

On this disk, recording was carried out under the same conditions as in Example 1, followed by evaluation.

The jitter value showing the actual signal characteristic was less than 10% of the clock period with the shortest mark length, and the initial characteristic was good. However, after 1,000 times of overwriting, the jitter increased abruptly. Especially, a long mark such as 11T was observed to remain without being completely erased. It is considered that since In was contained in a large amount, segregation resulted, whereby recrystallization (erasing) was hindered.

COMPARATIVE EXAMPLE 2

On a polycarbonate substrate, 80 nm of a $(ZnS)_{80}(SiO_2)_{20}$ layer, 20 nm of a $Zn_5In_2Sb_{62}Te_{31}$ layer as a recording layer, 20 nm of a $(ZnS)_{80}(SiO_2)_{20}$ layer and 200 nm of a $Al_{98.0}Ta_{2.0}$ alloy layer, were sequentially laminated by magnetron sputtering, and an ultraviolet tray-curable resin was further coated in a thickness of 4 μm to obtain a disk.

This optical disk was subjected to melt initialization at a linear velocity of 3 m/s at a beam-transferring speed (in the radial direction of the disk) of 50 μm/rotation with a laser power of 500 mW by means of the same optical disk initialization apparatus as used in Example 1, whereby initial crystallization was carried out by one scanning operation.

On this disk, recording was carried out under the same conditions as in Example 1, followed by evaluation.

The jitter value showing the actual signal characteristic was less than 10% of the clock period with the shortest mark length, and the initial characteristic was good. Further, even after 1,000 times of overwriting, the jitter was still less than 10% of the clock period and thus showed a good result. However, recorded signals deteriorated when it was left for 500 hours in an environment wherein the temperature was 80° C. and the relative humidity was 80%, and the jitter reached 20% of the clock period.

This disk was inspected, whereby it was found that amorphous bits partly underwent recrystallization and thus were partly erased. It is considered that the amount of In was too small that the crystallization temperature was as low as 140° C., whereby the thermal stability of amorphous marks was inadequate.

COMPARATIVE EXAMPLE 3

On a polycarbonate substrate, 80 nm of a $(ZnS)_{80}(SiO_2)_{20}$ layer, 20 nm of a $Zn_{15}In_5Sb_{51}Te_{29}$ layer as a recording layer, 20 nm of a $(ZnS)_{80}(SiO_2)_{20}$ layer and 170 nm of a $Al_{98.5}Ta_{1.5}$ alloy layer, were sequentially laminated by magnetron sputtering, and an ultraviolet ray-curable resin was further coated in a thickness of 4 μm to obtain a disk.

This optical disk was subjected to melt initialization at a linear velocity of 3 m/s at a beam-transferring speed (in the radial direction of the disk) of 50 μm/rotation with a laser power of 600 mW by means of the same optical disk initialization apparatus as used in Example 1, whereby initial crystallization was carried out by one scanning operation.

On this disk, recording was carried out under the same conditions as in Example 1, followed by evaluation.

In the first recording, the jitter value was slightly high at a level of 15% of the clock period with the shortest mark length. Besides, after 1,000 times of overwriting, the jitter remarkably increased to a level of at least 20% of the clock period.

COMPARATIVE EXAMPLE 4

On a polycarbonate substrate, 80 nm of a $(ZnS)_{80}(SiO_2)_{20}$ layer, 20 nm of a $Zn_{13}In_5Ge_3Sb_{52}Te_{27}$ layer as a recording layer, 20 nm of a $(ZnS)_{80}(SiO_2)_{20}$ layer and 170 nm of a $Al_{98.5}Ta_{1.5}$ alloy layer, were sequentially laminated by magnetron sputtering, and an ultraviolet ray-curable resin was further coated in a thickness of 4 μm to obtain a disk.

This optical disk was subjected to melt initialization at a linear velocity of 3.5 m/s at a beam-transferring speed (in the radial direction of the disk) of 50 μm/rotation with a laser power of 550 mW by means of the same optical disk initialization apparatus as used in Example 1, whereby initial crystallization was carried out by one scanning operation.

On this disk, recording was carried out under the same conditions as in Example 1, followed by evaluation.

In the initial recording, the jitter value was slightly high at a level of 15% of the clock period with the shortest mark length. Besides, after 1,000 times of overwriting, the jitter remarkably increased to a level of at least 20% of the clock period.

COMPARATIVE EXAMPLE 5

On a polycarbonate substrate, 80 nm of a $(ZnS)_{80}(SiO_2)_{20}$ layer, 20 nm of a $Ag_5In_3Sb_{62}Te_{30}$ layer as a recording layer, 20 nm of a $(ZnS)_{80}(SiO_2)_{20}$ layer and 170 nm of a $Al_{98.5}Ta_{1.5}$ alloy layer, were sequentially laminated by magnetron sputtering, and an ultraviolet ray-curable resin was further coated in a thickness of 4 μm to obtain a disk.

This optical disk was subjected to melt initialization at a linear velocity of 3.5 m/s at a beam-transferring speed (in the radial direction of the disk) of 10 μm/rotation with a laser power of 550 mW by means of the same optical disk initialization apparatus as used in Example 1, whereby initial crystallization was carried out by one scanning operation.

On this disk, recording was carried out under the same conditions as in Example 1, followed by evaluation.

The jitter value showing the actual signal characteristic was less than 10% of the clock period with the shortest mark length, and the initial characteristic was good. Further, even after 1,000 times of overwriting, this characteristic was maintained. However, the recorded signals deteriorated when they were left for 1,000 hours in an environment in which the temperature was 80° C. and the relative humidity was 80%, and the jitter reached to 20% of the clock period. It was found that amorphous bits partially underwent recrystallization and thus were partly erased.

EXAMPLE 5

On a polycarbonate substrate, 230 nm of a $(ZnS)_{80}(SiO_2)_{20}$ layer, 20 nm of a $Ag_6Ge_5Sb_{70}Te_{19}$ layer as a recording layer, 20 nm of a $(ZnS)_{80}(SiO_2)_{20}$ layer and 200 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This optical disk was subjected to melt initialization at a linear velocity of 4.5 m/s at a beam-transferring speed of 5 μm/rotation with a laser power of 250 mW by means of an optical disk initialization apparatus with an elliptic irradiation beam with a long axis of 50 μm, whereby the initial crystallization was carried out.

On this disk, EFM random signals (clock period: 115 nsec) were recorded at a linear velocity of 2.8 m/s by means of an optical disk evaluation apparatus (laser wavelength: 780 nm, NA: 0.55). During the recording, $\alpha 1=1$, $\alpha i=0.5$ ($i \geq 2$), $\beta i=0.5$, $Pw=13$ mW, $Pe=6.5$ mW, and $Pb=0.8$ mW.

The jitter value showing the actual signal characteristic was less than 10% of the clock period with the shortest mark length and thus showed a good result.

Further, this characteristic was maintained even after 1,000 times of overwriting.

Further, the recorded signals showed no deterioration even after being left for 1,000 hours in an environment in which the temperature was 80° C. and the relative humidity was 80%.

EXAMPLE 6

On a polycarbonate substrate, 230 nm of a $(ZnS)_{80}(SiO_2)_{20}$ layer, 20 nm of a $Ag_{10}Ge_7Sb_{66}Te17$ layer as a recording layer, 20 nm of a $(ZnS)_{80}(SiO_2)_{20}$ layer and 200 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This optical disk was subjected to melt initialization under the same conditions as in Example 5, whereby initial crystallization was carried out.

On this disk, recording was carried out under the same conditions as in Example 5, followed by evaluation.

The jitter value showing the actual signal characteristic was less than 10% of the clock period with the shortest mark length and thus showed a good result.

Further, this characteristic was maintained even after 1,000 times of overwriting.

Further, the recorded signals showed no deterioration even after being left for 1,000 hours in an environment in which the temperature was 80° C. and the relative humidity was 80%.

EXAMPLE 7

On a polycarbonate substrate, 230 nm of a $(ZnS)_{80}(SiO_2)_{20}$ layer, 20 nm of a $Zn_6Ge_7Sb_{60}Te_{27}$ layer as a recording layer, 20 nm of a $(ZnS)_{80}(SiO_2)_{20}$ layer and 200 nim of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This optical disk was subjected to melt initialization under the same conditions as in Example 5, whereby initial crystallization was carried out.

On this disk, recording was carried out under the same conditions as in Example 5, followed by evaluation.

The jitter value showing the actual signal Icharacteristic was less than 10% of the clock period with the shortest mark length and thus showed a good result. Further, this characteristic was maintained even after 1,000 times of overwriting.

Further, the recorded signals showed no deterioration even after being left for 1,000 hours in an environment in which the temperature was 80° C. and the relative humidity was 80%.

EXAMPLE 8

On a polycarbonate substrate, 230 nm of a $(ZnS)_{80}(SiO_2)_{20}$ layer, 20 nm of a $Zn_3Ge_3Sb_{61}Te_{28}$ layer as a recording layer, 20 nm of a $(ZnS)_{80}(SiO_2)_{20}$ layer and 200 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This optical disk was subjected to a first step of initialization crystallization at a linear velocity of 4.5 m/s at a beam-transferring speed of 5 μm/rotation with a laser power of 300 mW by means of the same optical disk initialization apparatus as used in Example 5 to increase the reflectivity to a level of 80% of the final crystalline state, and further subjected to irradiation once with 11 mW by the following tester, whereby melt initial crystallization was carried out. It is regarded that so long as initialization can be completed by irradiation of twice of this level, there will be no problem from the industrial point of view.

On this disk, recording was carried out under the same conditions as in Example 5, followed by evaluation.

The jitter value showing the actual signal characteristic was less than 10% of the clock period with the shortest mark length and thus showed a good result. Further, this characteristic was maintained even after 1,000 times of overwriting.

EXAMPLE 9

On a polycarbonate substrate, 230 nm of a $(ZnS)_{80}(SiO_2)_{20}$ layer, 20 nm of a $Zn_6Ge_7Sb_{62}Te_{25}$ layer as a recording layer, 20 nm of a $(ZnS)_{80}(SiO_2)_{20}$ layer and 200 nm of a $Al_{97.5}Ta_{2.5}$ alloy layer, were sequentially laminated by magnetron sputtering, and an ultraviolet ray-curable resin layer was further formed in a thickness of 4 µm to obtain an optical disk.

This optical disk was subjected to melt initialization under the same conditions as in Example 5, whereby initial crystallization was carried out.

On this disk, EFM random signals (clock period: 115 nsec) were recorded at a linear velocity of 2.8 m/s by means of an optical disk evaluation apparatus (laser wavelength: 780 nm, NA: 0.55). During the recording, $\alpha1=1$, $\alpha i=0.45$ ($i\geq2$), $\beta i=0.55$, Pw=14 mW, Pe=6.5 mW, Pb=0.8 mW.

The jitter value showing the actual signal characteristic was less than 10% of the clock period with the shortest mark length and thus showed a good result. Further, this characteristic was maintained even after 1,000 times of overwriting.

Further, the recorded signals showed no deterioration even after being left for 500 hours in an environment in which the temperature was 80° C. and the relative humidity was 80%.

COMPARATIVE EXAMPLE 6

On a polycarbonate substrate, 230 nm of a $(ZnS)_{80}(SiO_2)_{20}$ layer, 20 nm of a $Ag_5Sb_{66}Te_{29}$ layer as a recording layer, 20 nm of a $(ZnS)_{80}(SiO_2)_{20}$ layer and 200 nm of a $Al_{97.5}Ta_{2.5}$ alloy layer, were sequentially laminated by magnetron sputtering, and an ultraviolet ray-curable resin layer was further formed in a thickness of 4 µm to obtain an optical disk.

This optical disk was subjected to melt initialization under the same conditions as in Example 5, whereby initial crystallization was carried out.

On this disk, recording was carried out under the same conditions as in Example 5, followed by evaluation.

The jitter value showing the actual signal characteristic was less than 10% of the clock period with the shortest mark length, and thus the initial characteristic was good. Further, this characteristic was maintained even after 1,000 times of overwriting.

However, the recorded signals deteriorated after being left for 500 hours in an environment in which the temperature was 80° C. and a relative humidity was 80%, and the jitter reached 20% of the clock period. It was found that amorphous bits were partially recrystallized and partially erased.

EXAMPLE 10

On a polycarbonate substrate, 230 nm of a $(ZnS)_{80}(SiO_2)_{20}$ layer, 1 nm of a $Sb_2Te_3$ layer as a crystallization accelerating layer, 1 nm of Sb layer as a composition-adjusting layer, 18 nm of a $Ge_{10}Sb_{67}Te_{23}$ layer as a recording layer, 20 nm of a $(ZnS)_{80}(SiO_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 µm to obtain an optical disk.

This optical disk was subjected to melt initial crystallization at a disk rotational speed of 2,700 rpm at a beam-transferring speed of 5 µm/rotation with a laser power of 400 mW with a radius of 64 mm and a laser power of 170 mW with a radius of 27 mm by means of an optical disk initialization apparatus with an elliptic irradiation beam having a long axis of about 50 Wm. whereby initial crystallization was carried out.

On this disk, EFM random signals (clock period: 115 nsec) were recorded at a linear velocity of 2.8 m/s by means of an optical disk evaluation apparatus (laser wavelength: 780 nm, NA: 0.55). During the recording, $\alpha1=1$, $\alpha i=0.5$ ($i\geq2$), $\beta i=0.5$, Pw=13 mW, Pe=6.5 mW, and Pb=0.8 mW.

The jitter value showing the actual signal characteristic was less than 10% of the clock period with the shortest mark length and thus showed a good result, and this characteristic was maintained even after 1,000 times of overwriting.

Further, the recorded signals showed no deterioration even after being left for 2,000 hours in an environment in which the temperature was 80° C. and a relative humidity was 80%.

EXAMPLE 11

On a polycarbonate substrate, 230 nm of a $(ZnS)_{80}(SiO_2)_{20}$ layer, 1 nm of a $Sb_2Te_3$ layer as a crystallization accelerating layer, 19 nm of a $Ge_{10}Sb_{67}Te_{23}$ layer as a recording layer, 20 nm of a $(ZnS)_{80}(SiO_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 µm to obtain an optical disk.

This disk was subjected to initialization under the same conditions as in Example 10, whereby initialization was carried out.

On this disk, recording was carried out under the same conditions as in Example 10, followed by evaluation.

The jitter value showing the actual signal characteristic was less than 10% of the clock period with the shortest mark length and thus showed a good result. This characteristic was maintained even after 1,000 times of overwriting.

Further, the recorded signals showed no deterioration even after being left for 2,000 hours in an environment in which the temperature was 80° C., and the relative humidity was 80%.

EXAMPLE 12

On a polycarbonate substrate, 230 nm of a $(ZnS)_{80}(SiO_2)_{20}$ layer, 20 nm of a $Ge_{10}Sb_{67}Te_{23}$ layer as a recording layer, 20 nm of a $(ZnS)_{80}(SiO_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 µm to obtain an optical disk.

This disk was subjected to initialization under the same conditions as in Example 10, but initialization could not be carried out. Therefore, melt initial crystallization was carried out by irradiating a DC laser beam many times to every track by means of an optical disk evaluation apparatus.

On this disk, recording was carried out under the same conditions as in Example 10, followed by evaluation.

The jitter value showing the actual signal characteristic was less than 10% of the clock period with the shortest mark length and thus showed a good result. This characteristic was maintained even after 1,000 times of overwriting.

Further, the recorded signals showed no deterioration even after being left for 2,000 hours in an environment in which the temperature was 80° C., and the relative humidity was 80%.

EXAMPLE 13

On a polycarbonate substrate, 80 nm of a $(ZnS)_{80}(SiO_2)_{20}$ layer, 20 nm of a $Ge_{12}Sb_{66}Te_{22}$ layer as a recording layer, 20 nm of a $(ZnS)_{80}(SiO_2)_{20}$ layer and 200 nm of a $Al_{98.5}Ta_{1.5}$ alloy layer, were sequentially laminated by magnetron sputtering, and an ultraviolet ray-curable resin was further coated in a thickness of 4 μm to obtain a disk.

This optical disk was subjected to initial crystallization at a linear speed of from 2.0 to 5.0 m/s at a beam-transferring rate (in the radial direction of the disk) of from 10 to 50 μm/rotation with a laser power of from 500 to 900 mW by means of the same optical disk initialization apparatus as used in Example 1, whereby initial crystallization was incomplete and non-uniform. With a power of at least 800 mW, defects resulted due to deterioration by heat. Therefore, melt initial crystallization was carried out by irradiating a DC laser beam many times to every track by means of an optical disk evaluation apparatus.

On this disk, recording was carried out under the same conditions as in Example 10, followed by evaluation.

The jitter value showing the actual signal characteristic was less than 10% of the clock period with the shortest mark length and thus showed a good result. This characteristic was maintained even after 1,000 times of overwriting.

Further, the recorded signals showed no deterioration even after being left for 2,000 hours in an environment in which the temperature was 80° C., and the relative humidity was 80%.

EXAMPLE 14

On a polycarbonate substrate, 230 nm of a $(ZnS)_{80}(SiO_2)_{20}$ layer, 20 nm of a $Ge_{10}Sb_{67}Te_{23}$ layer as a recording layer, 20 nm of a $(ZnS)_{80}(SiO_2)_{20}$ layer and 200 nm of a $Al_{7.5}Ta_{2.5}$ alloy layer, were sequentially laminated by magnetron sputtering, and an ultraviolet ray-curable resin layer was further formed in a thickness of 4 μm to obtain an optical disk.

This optical disk was subjected to initialization under the same conditions as in Example 5, but initial crystallization could not be carried out. Therefore, melt initial crystallization was carried out by irradiating a DC laser beam many times to every track by means of an optical disk evaluation apparatus.

On this disk, recording was carried out under the same conditions as in Example 10, followed by evaluation.

The jitter value showing the actual signal characteristic was less than 10% of the clock period with the shortest mark length and thus showed a good result. This characteristic was maintained even after 1,000 times of overwriting.

Further, the recorded signals showed no deterioration even after being left for 2,000 hours in an environment in which the temperature was 80° C., and the relative humidity was 80%.

EXAMPLE 15

On a polycarbonate substrate, 230 nm of a $(ZnS)_{80}(SiO_2)_{20}$ layer, 20 nm of a $Ge_7Sb_{65}Te_{28}$ layer as a recording layer, 20 nm of a $(ZnS)_{80}(SiO_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This disk was subjected to initialization under the same conditions as in Example 10, but initial crystallization could not be carried out. Therefore, melt initial crystallization was carried out by irradiating a DC laser beam many times to every track by an optical disk evaluation apparatus.

On this disk, recording was carried out under the same conditions as in Example 10, followed by evaluation.

The jitter value showing the actual signal characteristic was less than 10% of the clock period with the shortest mark length and thus showed a good result, and this characteristic was maintained even after 1,000 times of overwriting.

Further, the recorded signals showed no deterioration even after being left for 1,000 hours in an environment in which the temperature was 80° C., and the relative humidity was 80%.

COMPARATIVE EXAMPLE 7

On a polycarbonate substrate, 230 nm of a $(ZnS)_{80}(SiO_2)_{20}$ layer, 20 nm of $Sd_{72}Te_{28}$ layer as a recording layer, 20 nm of a $(ZnS)_{80}(Sio_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This disk was subjected to initialization under the same conditions as in Example 10, but initial crystallization could not be carried out. Therefore, melt initial crystallization was carried out by irradiating a DC laser beam many times to every track by an optical disk evaluation apparatus.

On this disk, recording was carried out under the same conditions as in Example 10, followed by evaluation.

The jitter value showing the actual signal characteristic was less than 10% of the clock period with the shortest mark length and thus showed a good result, and this characteristic was maintained even after 1,000 times of overwriting. However, the recorded signals deteriorated after being left for 500 hours in an environment in which the temperature was 80° C., and the relative humidity was 80%, and it was impossible to readout the signals.

COMPARATIVE EXAMPLE 8

On a polycarbonate substrate, 230 nm of a $(ZnS)_{80}(SiO_2)_{20}$ layer, 20 nm of a $Ge_{21}Sb_{61}Te_{18}$ layer as a recording layer, 20 nm of a $(ZnS)_{80}(SiO_2)_{20}$ layer and 100 nm of a $Al_{97.5}Ta_{2.5}$ alloy layer, were sequentially laminated by magnetron sputtering, and an ultraviolet ray-curable resin layer was further formed in a thickness of 4 μm to obtain an optical disk.

This disk was subjected to initialization under the same conditions as in Example 10, but initial crystallization could not be carried out. Therefore, melt initial crystallization was carried out by irradiating a DC laser beam many times to every track by an optical disk evaluation apparatus.

On this disk, recording was carried out in the same manner as in Example 10, followed by evaluation.

The jitter value showing the actual signal characteristic was at least 10% of the clock period with the shortest mark length, and thus no good characteristic was obtained.

As described in the foregoing, by the present invention, it is possible to provide an optical recording medium which has excellent archival stability and high durability in repetitive overwriting and has a low jitter in high density mark length recording. Further, by using such a recording medium in combination with the optical recording method of the present invention, mark length recording of higher precision can be realized.

What is claimed is:

1. An optical information recording medium having a multilayer structure comprising at least a lower protective layer, a phase-change type optical recording layer, an upper protective layer, a reflective layer and a crystallization accelerating layer, on a substrate, wherein the phase-change type optical recording layer has a composition of $Ge_f(Sb_dTe_{1-d})_{1-f}$ where $0.65 \leq d \leq 0.85$, and $0.01 \leq f \leq 0.20$ and comprises as the main component, an SbTe alloy of the SbTe eutectic composition or a composition including an excess amount of Sb over the SbTe eutectic composition and has a thickness of from 15 to 30 nm, the upper protective layer has a thickness of from 10 to 50 nm, the reflective layer is made of a metal containing at least 90 atomic % of Au, Ag or Al and has a thickness of from 50 to 500 nm, the crystallization accelerating layer is per se crystalline during deposition and is formed between the phase-change type optical recording layer and the lower protective layer in a thickness of from 0.2 to 10 nm and is made of $Sb_aT_{1-a}$, where $0.3 \leq a \leq 0.5$, and an initialization operation is carried out by irradiating an energy beam to the recording layer for crystallization.

2. The optical information recording medium according to claim 1, wherein the upper protective layer has a thickness of from 10 nm to 30 nm.

3. The optical information recording medium according to claim 1, wherein $0.65 \leq d \leq 0.75$, and $0.02 \leq f \leq 0.15$, and recording is carried out at a linear velocity of from 2 to 7 m/s.

4. The optical information recording medium according to claim 1, wherein the lower protective layer has a thickness of from 50 to 500 nm, of which a portion of from 1 to 10 nm on the side contacting the recording layer, is made of a mixture comprising a chalcogen compound and a heat resistant compound having a decomposition temperature or melting point of at least 1,000° C. which is not a chalcogen compound, and the rest is made of a heat resistant compound of a different or same type as said heat resistant compound.

5. The optical information recording medium according to claim 1, furtlier comprising a protective coating layer made of an ultraviolet curable or thermosetting resin formed on top of said reflective layer, and wherein said lower and upper protective layers are made of a mixture of ZnS and $SiO_2$.

6. The optical information recording medium according to claim 1, wherein to carry out an initialization operation by irradiating an energy beam for crystallization, after forming the phase-change type optical recording layer, the recording layer is locally melted and crystallized during resolidification.

7. The optical information recording medium according to claim 1, wherein a composition-adjusting layer is formed adjacent to the crystallization accelerating layer, so that the composition averaging the compositions of the composition-adjusting layer and the crystallization accelerating layer is close to the composition of the recording layer.

* * * * *

UNITED STATES PATENT AND TRADEMARK OFFICE
CERTIFICATE OF CORRECTION

PATENT NO. : 6,294,310 B1
DATED : September 25, 2001
INVENTOR(S) : Takashi Ohno et al.

It is certified that error appears in the above-identified patent and that said Letters Patent is hereby corrected as shown below:

Column 32,
Line 11, "furtlier" should read -- further --.

Signed and Sealed this

Seventeenth Day of January, 2006

JON W. DUDAS
*Director of the United States Patent and Trademark Office*